(12) United States Patent
Ishii et al.

(10) Patent No.: US 11,254,275 B2
(45) Date of Patent: Feb. 22, 2022

(54) AIRBAG DEVICE FOR A DRIVER'S SEAT

(71) Applicant: TOYODA GOSEI CO., LTD., Kiyosu (JP)

(72) Inventors: Tsutomu Ishii, Kiyosu (JP); Koji Kawamura, Kiyosu (JP); Hitoshi Iida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 14 days.

(21) Appl. No.: 16/797,352

(22) Filed: Feb. 21, 2020

(65) Prior Publication Data

US 2020/0307486 A1 Oct. 1, 2020

(30) Foreign Application Priority Data

Mar. 27, 2019 (JP) .............................. JP2019-060030
Sep. 30, 2019 (JP) .............................. JP2019-178716

(51) Int. Cl.
*B60R 21/203* (2006.01)
*B60R 21/237* (2006.01)

(52) U.S. Cl.
CPC .......... *B60R 21/203* (2013.01); *B60R 21/237* (2013.01)

(58) Field of Classification Search
CPC .............................. B60R 21/203; B60R 21/237
USPC ......................................................... 280/731
See application file for complete search history.

(56) References Cited

U.S. PATENT DOCUMENTS

| 10,836,339 | B2* | 11/2020 | Kadam ................. B60R 21/231 |
| 2005/0098992 | A1* | 5/2005 | Yamada ................ B60R 21/233 |
| | | | 280/743.1 |
| 2017/0210331 | A1 | 7/2017 | Komatsu et al. |
| 2018/0281731 | A1 | 10/2018 | Hotta et al. |
| 2019/0001915 | A1* | 1/2019 | Hotta .................... B60R 21/239 |

FOREIGN PATENT DOCUMENTS

| JP | 2013-006589 A | 1/2013 |
| JP | 2017-128279 A | 7/2017 |
| JP | 2018-167681 A | 11/2018 |

* cited by examiner

*Primary Examiner* — Keith J Frisby
(74) *Attorney, Agent, or Firm* — Posz Law Group, PLC

(57) ABSTRACT

An airbag device for a driver's seat adapted to be mounted on a boss of a steering wheel disposed at a center of a rim is disclosed. The airbag device includes an inflatable airbag folded in the form of an airbag package. The airbag includes a vehicle-side wall that includes a gas inlet port and is configured to be supported by the rim when deployed, and a driver-side wall. The airbag, before folded into the airbag package, has a flat initial folded form in which the driver-side wall lies over the vehicle-side wall. The initial folded form includes a folded-in portion in which a front edge portion of the vehicle-side wall is folded inwardly and rearwardly beneath a front edge portion of the driver-side wall, and a folded-back portion in which the front edge portion of the driver-side wall which adjoins the folded-in portion is folded towards the inlet port on the vehicle-side wall.

5 Claims, 18 Drawing Sheets

(A)

(B)

(C)

AIRBAG DEVICE FOR A DRIVER'S SEAT

CROSS REFERENCE TO RELATED APPLICATIONS

The Present application claims priority from Japanese Patent Application No. 2019-060030 of Ishii et al., filed on Mar. 27, 2019, and Japanese Patent Application No. 2019-178716 of Ishii et al., filed on Sep. 30, 2019, the entire disclosures of which are incorporated herein by reference.

BACKGROUND

1. Technical Field

The present invention relates to an airbag device for a driver' seat that is adapted to be mounted on a boss section of a steering wheel which boss section is located in a vicinity of the center of a rim, and that includes an airbag which is inflatable for protecting the driver.

2. Description of Related Art

JP 2017-128279 A discloses a known airbag device for a driver's seat that is adapted to be mounted on a boss section of a steering wheel. The airbag device is configured to deploy a front portion of an airbag beneath the rim so as not to deploy the airbag under the chin of the driver, in the event that the airbag device is actuated when the driver is located in proximity to the steering wheel. An outer shell of the airbag includes a vehicle-side wall that includes an inlet port for introducing an inflation gas in a vicinity of the center thereof and is configured to be supported by an upper surface of the rim at deployment, and a driver-side wall that extends from an outer circumferential edge of the vehicle-side wall and covers the inlet port. In order to be stowed in the boss section, the airbag is folded up in the form of an airbag package, i.e. a completely folded form. Before folded up into the airbag package, the airbag has an initial folded form in which the airbag is folded in a flat fashion such that the driver-side wall lies over the vehicle-side wall. The initial folded form includes a folded-back portion that is formed by folding a front portion of the airbag on the vehicle-side wall towards the inlet port.

When inflated, the airbag unfolds generally in a reverse order to the order of folding processes. Accordingly, with the above airbag device for a driver's seat, the folded-back portion of the initial folded form unfolds in a final stage of unfolding. The airbag is configured, if the driver is located in proximity to the steering wheel, such that the folded-back portion, i.e. the front portion of the airbag, deploys under a front portion of the rim, instead of deploying towards the chin of the driver. Thus the above conventional airbag device is able to deploy the airbag suitably for an OOP (our-of-position) driver.

However, if the folded-back portion in the initial folded form of the airbag is deployed under the front portion of the rim in response to an OOP driver, that means that the inflated airbag is not placed between the front portion of the rim and the driver. Therefore, there is a room for improvement in restraining the driver with the airbag.

SUMMARY

An exemplary embodiment of the invention relates to an airbag device for a driver's seat adapted to be mounted on a boss section of a steering wheel of a vehicle which boss section is disposed in a vicinity of a center of a rim of the steering wheel for gripping when driving. The airbag device includes an airbag that is folded up in the form of an airbag package so as to be stowed in the boss section, and that is unfoldable and inflatable for protecting a driver. An outer shell of the airbag includes a vehicle-side wall that includes an inlet port for introducing an inflation gas in a vicinity of the center, and that is configured to be supported by an upper surface of the rim of the steering wheel when deployed, and a driver-side wall for restraining the driver. The driver-side wall extends from an outer circumferential edge of the vehicle-side wall and covers the inlet port. The airbag, before folded up into the airbag package, has an initial folded form in which the airbag is folded in a flat fashion such that the driver-side wall lies over the vehicle-side wall. The initial folded form of the airbag includes a folded-in portion in which a front edge portion of the vehicle-side wall for forming a front portion of the airbag as deployed is folded inwardly towards the inlet port beneath a front edge portion of the driver-side wall as laid flat, and a folded-back portion in which the front edge portion of the driver-side wall which adjoins the folded-in portion is folded towards a front end portion of the vehicle-side wall which extends from the inlet port and adjoins the folded-in portion.

The folded-back portion of the initial folded form of the airbag may be configured such that the front edge portion of the driver-side wall as folded back lies beneath the front end portion of the vehicle-side wall, or such that the front edge portion of the driver-side wall as folded back lies on the front end portion of the vehicle-side wall. The folded-back portion may also be configured such that the front edge portion of the driver-side wall as folded back does not overlap with the front end portion of the vehicle-side wall but is disposed in proximity to the front end portion of the vehicle-side wall.

In the airbag device of the exemplary embodiment, it is desired that the airbag package includes a radial-folded portion in which a portion of the initial folded form disposed between the inlet port and an outer peripheral edge of the initial folded form is compressed towards the inlet port along a radial direction of the initial folded form.

In the airbag device of the exemplary embodiment, it is also desired that a thickness of the front portion of the airbag as inflated is greater than that of a rear portion of the airbag as inflated.

The airbag device of the exemplary embodiment may be configured to be mounted on such a steering wheel that a width in a front and rear direction of a front portion of the rim positioned farther forward than a center of the boss section is smaller than a width in a left and right direction of each of a left portion and a right portion of the rim positioned farther to the left or right than the center of the boss section.

In the airbag device of the exemplary embodiment, it is desired that:

the driver-side wall is composed of a driver-side base cloth;

the vehicle-side wall is composed of a vehicle-side base cloth, the vehicle-side base cloth including a rear-side component that is provided with the inlet port and a front-side component that includes a portion for forming the folded-in portion, a rear edge of the front-side component being joined to a front edge of the rear-side base cloth to form the vehicle-side base cloth; and an outer circumferential edge of the vehicle-side base cloth and an outer circumferential edge of the driver-side base cloth are joined together to form the outer shell of the airbag.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Figure 1:
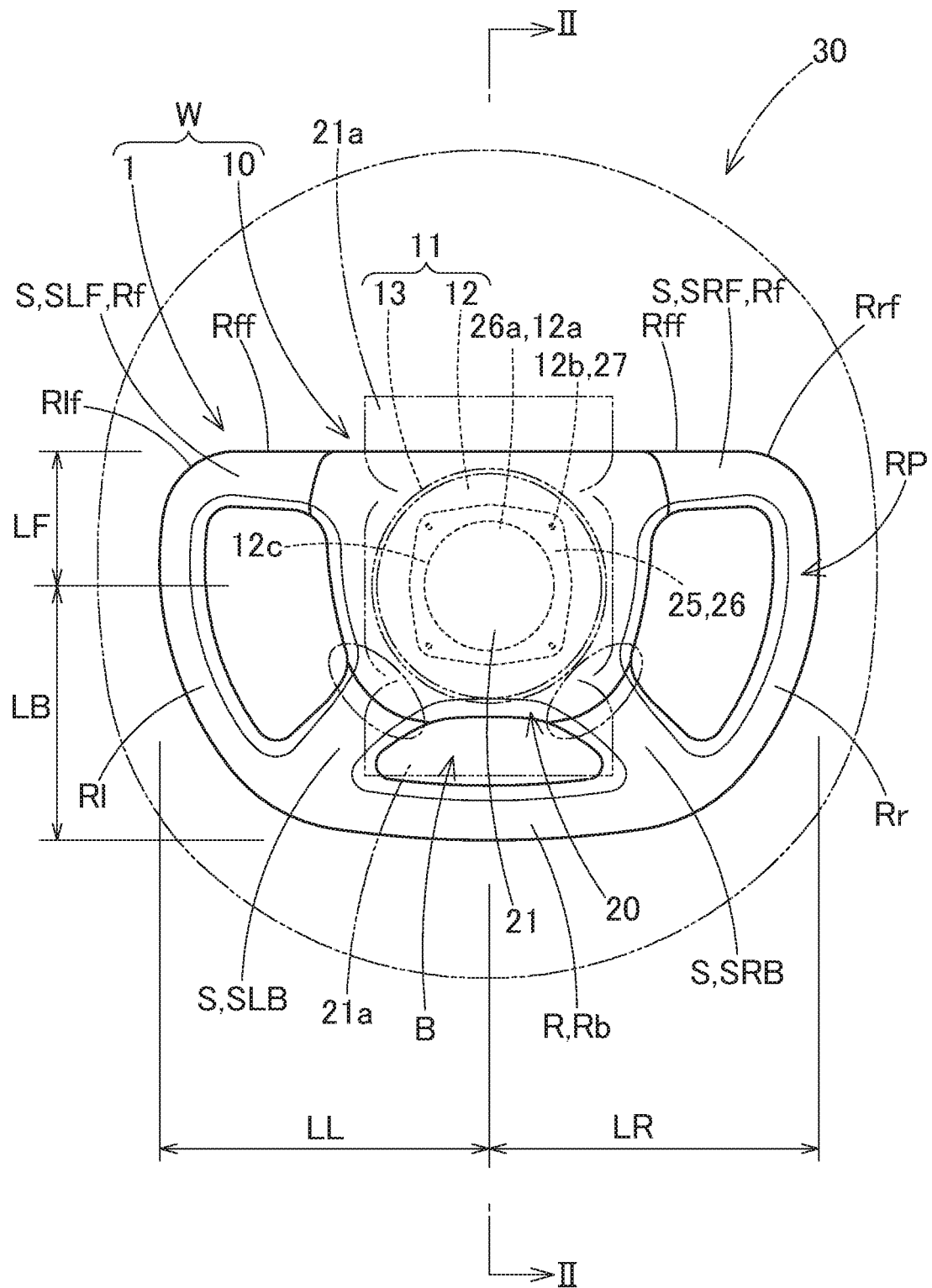
FIG. 1 is a schematic plan view of a steering wheel equipped with an airbag device for a driver's seat in accordance with an exemplary embodiment.
Figure 2:
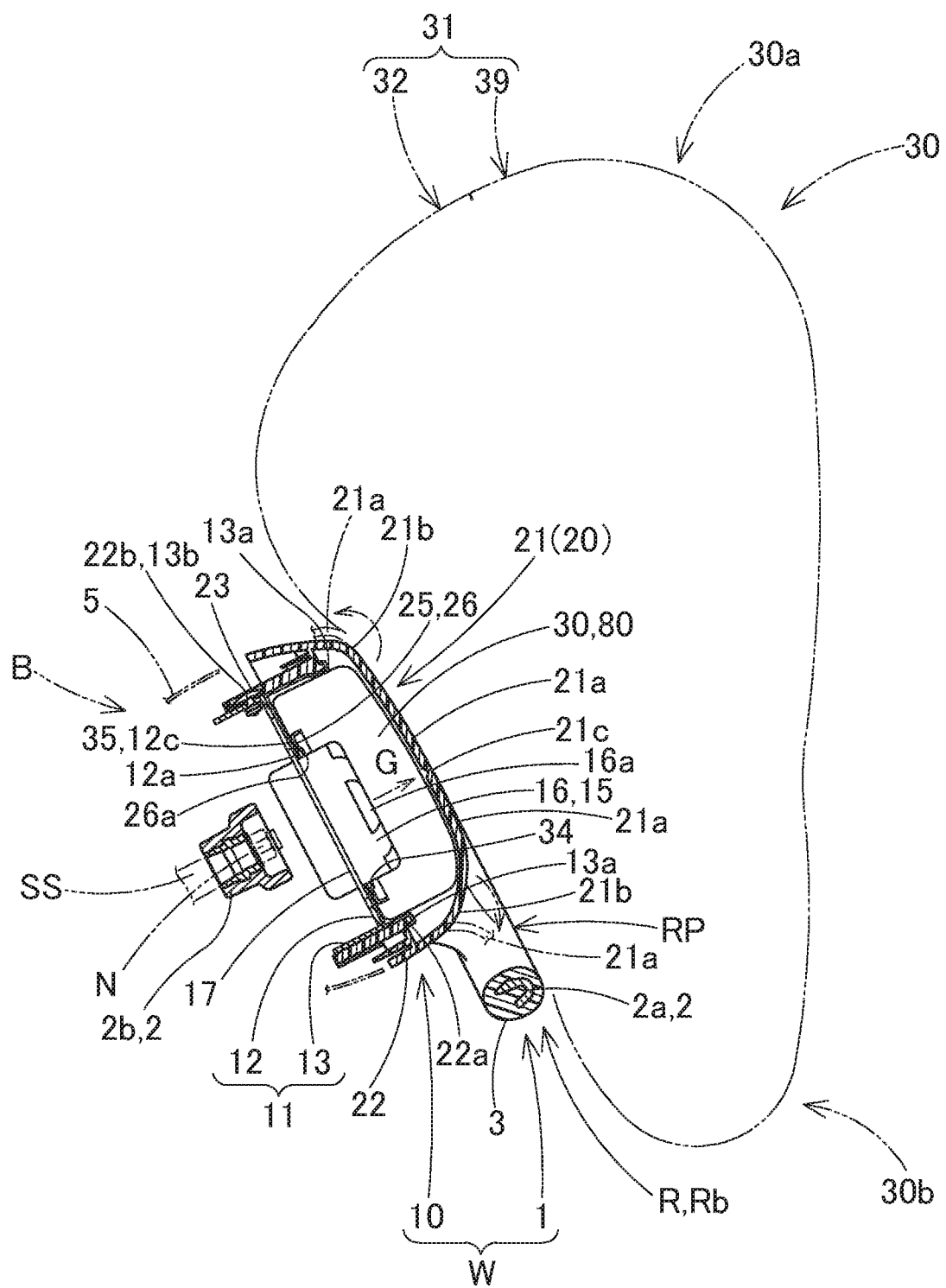
FIG. 2 is a schematic vertical sectional view taken along line of FIG. 1.

As shown in FIGS. 1 and 2, an airbag device 10 for a driver's seat in accordance with an exemplary embodiment is mounted on a boss section B of a steering wheel W of a vehicle. The steering wheel W includes a wheel body 1 and the airbag device 10. The wheel body 1 includes a rim R, which is for hand-holding for steering operation, the boss section B which is disposed at the center of the rim R, and one or more spokes S which interconnect the boss section B and the rim R. The airbag device 10 is mounted on top of the boss section B.

In this specification, up-down, left-right, and front-rear directions of the airbag device 10, an airbag 30, the steering wheel W and so on are based on the steering wheel W which is nut N fixed and connected to the steering shaft SS (FIG. 2) of the vehicle and steered straight ahead. Specifically, the up and down direction corresponds to an up and down direction extending along an axial direction of the steering shaft SS. The left and right direction corresponds to a left and right direction of the vehicle which is orthogonal to the axial direction of the steering shaft SS. The front and rear direction corresponds to a front and rear direction of the vehicle which is orthogonal to the axial direction of the steering shaft SS.

Referring to FIG. 1, in the wheel body 1 of the steering wheel W, the spokes S are composed of four spokes SLF, SLB, SRF and SRB which extend from the boss section B. The rim R interconnects the four spokes S behind the boss section B generally in a U shape, as viewed from above. A width (or front part width) LF in the front and rear direction of a front portion Rf of the rim R (i.e. a portion of the rim R positioned farther forward than a center of the boss section B) is smaller than a width LL and a width LR (i.e. a left part width LL and a right part width LR) in the left and right direction of left and right portions Rl, Rr of the rim R (i.e. portions of the rim R positioned farther to the left or right than the center of the boss section B). Further, a width (or rear part width) LB in the front and rear direction of a rear portion of the rim R (i.e. a portion of the rim R positioned farther rearward than the center of the boss section B) is greater than the front part width LF, but is smaller than the left part width LL or right part width LR. The spokes SLF and SRF are configured to be grippable, thus concurrently act as a front portion Rf of the rim R.

The wheel body 1 includes a skeleton 2 of such a shape that the rim R, boss section B and spokes S are interconnected, and a cladding layer 3 that covers the skeleton 2 at the rim R and regions of the spokes S adjoining the rim R. The cladding layer 3 is fabricated from urethane or the like. The skeleton 2 includes a rim portion 2a which forms the rim R, a boss portion 2b which forms the boss section B and connected to the steering shaft SS, and spoke portions (not shown) which form the spokes S and interconnect the rim portion 2a and boss portion 2b.

The wheel body 1 further includes a lower cover 5 underneath the boss section B.

The rim R of the steering wheel 111 is mounted on the vehicle such that the rear portion Rb is positioned farther downward than the front portion Rf for easy steering. Accordingly, an upper surface RP of the rim R, which is configured to support the airbag as deployed, faces obliquely upward and rearward.

The airbag device 10 includes an airbag package 80, which is a completely folded form of an airbag 30, an inflator 15 for feeding the airbag 30 with an inflation gas, an airbag cover (or pad) 20 which covers the airbag package 80 and is disposed on top of the boss section B of the steering wheel W, and a bag holder (or case) 11 which holds and houses the airbag package 80 for mounting the airbag 30 on the boss section B. The airbag package 80 is formed into a generally pot-like shape. The bag holder 11 not only holds and houses the airbag package 80 but also holds the inflator 15 and airbag cover 20.

The airbag package 80 includes, inside the bottom portion, a retainer 25 used for mounting on the bag holder 11. The retainer 25 is made of sheet metal into a square annular shape. The airbag 30 is firstly folded into an initial folded form 78 with the retainer 25 disposed inside, as can be seen in (D) of FIG. 5 and (C) of FIG. 6, further folded into the airbag package 80 as can be seen in (B) of FIG. 8, then mounted on the bag holder 11. The retainer 25 includes a square annular bottom wall 26 which is provided with downward-protruding bolts 27 at the four corners. The bottom wall 26 includes, at the center, an opening 26a for receiving a later-described body 16 of the inflator 15.

The inflator 15 includes a body 16 which has a pot-like shape and a flange 17 which protrudes from an outer circumference of the body 16 in a square annular shape. The flange 17 is provided with not-shown through holes for receiving the bolts 27 of the retainer 25. The body 16 includes a plurality of gas discharge ports 16a for emitting an inflation gas G in the portion disposed farther upward than the flange 17.

The airbag cover 20 is fabricated from synthetic resin such as thermoplastic elastomer of olefin (TPO) or the like, and disposed on top of the boss section B. The airbag cover 20 includes a ceiling wall 21 which covers the airbag package 80 stored inside the boss section B from above and a side wall 22 which extends downwardly from an underside of the ceiling wall 21 generally in a square tubular shape and covers the circumference of the airbag package 80.

The ceiling wall 21 includes two doors 21a which are configured to open forward and rearward when pushed by the airbag 30 as inflated. The doors 21a have hinge portions 21b at the front and rear edges as can be seen in FIG. 2. A thinned breakable portion 21c is formed around the doors 21a generally in a H shape as viewed from above.

The side wall 22 of the airbag cover 20 includes at least one connecting edge portion 22a for engagement with a later-described retaining portion 13a of a supporting wall 13 of the bag holder 11, and at least one connecting hole 22b for receiving a rivet 23 that fixes the side wall 22 to the supporting wall 13.

The bag holder 11 is made of sheet metal. The bag holder 11 holds the airbag package 80, the inflator 15 and the airbag cover 20, and mounts the airbag device 10 on the wheel body 1 of the steering wheel W with the use of not-shown, at least one connecting bracket. The bag holder 11 includes a generally annular base plate 12 and a supporting wall 13 which protrudes upwardly and rearwardly from the outer circumferential edge of the base plate 12 for supporting the side wall 22 of the airbag cover 20.

The base plate 12 is provided, at the center, a generally round insert hole 12a for receiving the inflator body 16 from below and communicating with a later-described inlet port 34 of the airbag 30. In a periphery of the insert hole 12b, there are disposed four through holes 12b for receiving the bolts 27 of the retainer 25. This peripheral region of the insert hole 12a provided with the through holes 12b serves as a mounting seat 12c on which the airbag package 80 and inflator 15 are mounted with the use of the retainer 25.

As described above, the supporting wall 13 includes at east one retaining portion 13a for retaining the side wall 22 of the airbag cover 20 and at least one connecting hole 13b for receiving the rivet 23.

Figure 3:
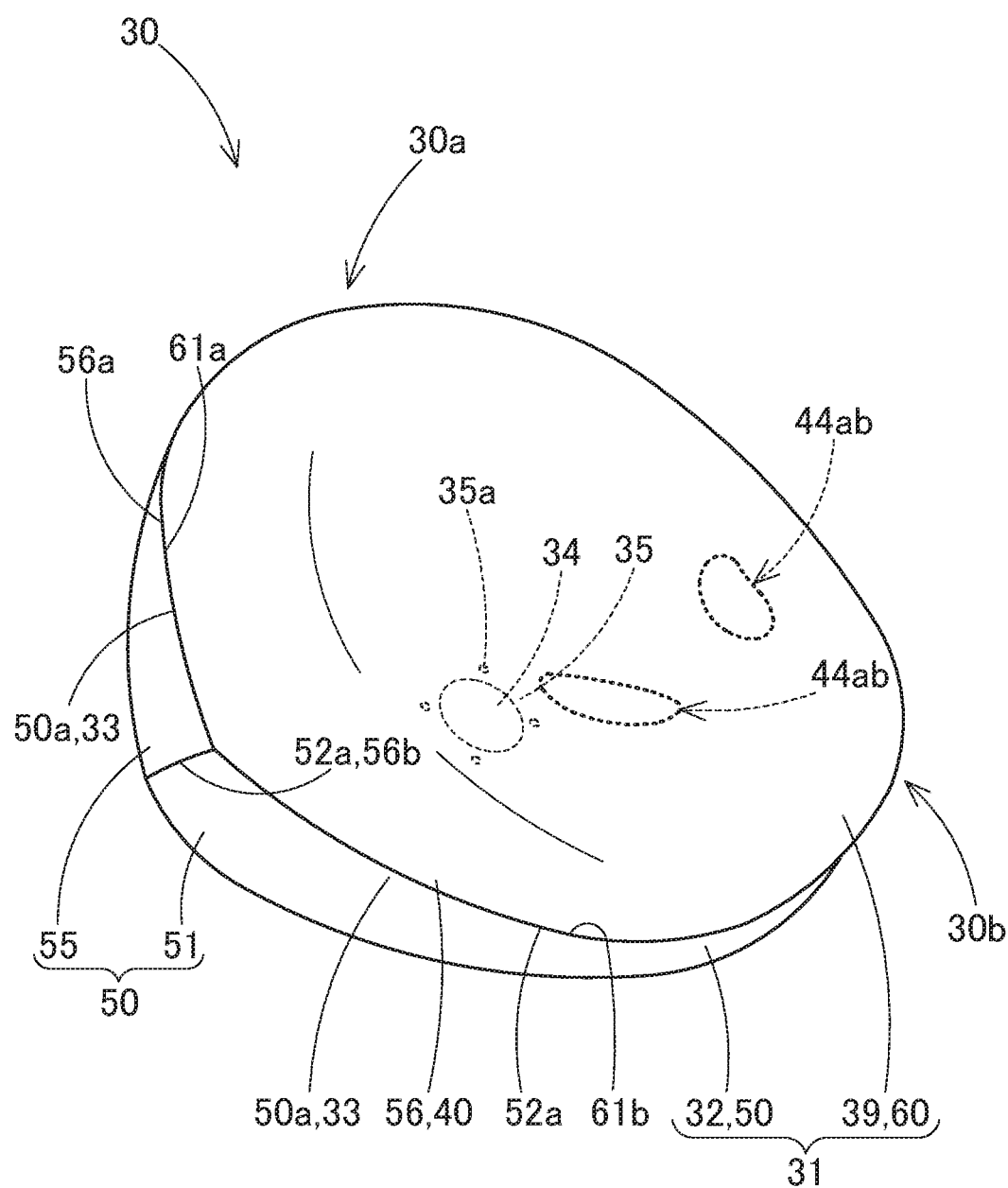
FIG. 3 is a schematic perspective view of an airbag of the airbag device of FIG. 1 as inflated by itself.
Figure 10:
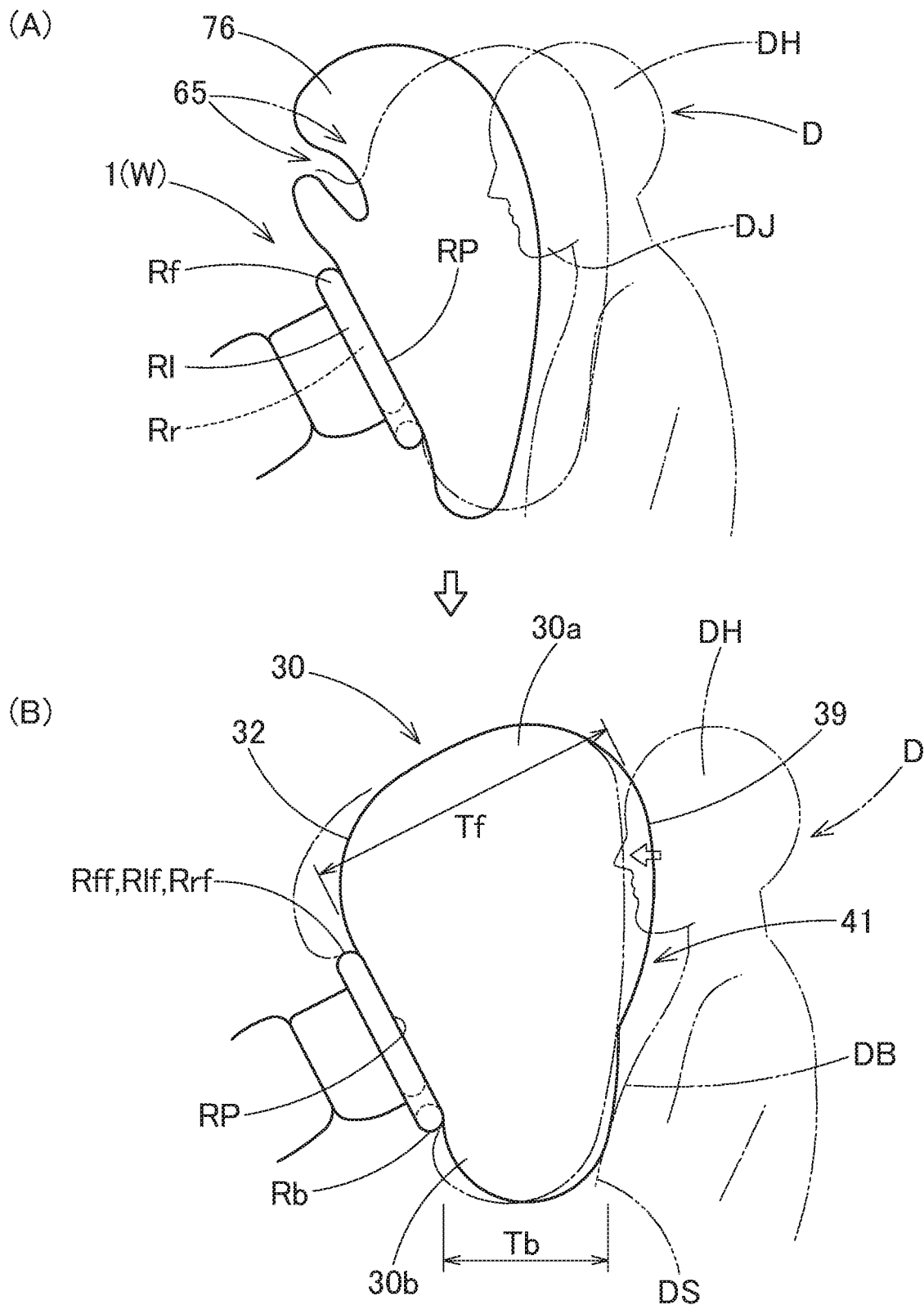

As can be seen in FIGS. 1 and 2 (with dashed-and-double-dotted lines) and (B) of FIG. 10, the airbag 30 is configured inflatable into a generally disk shape whose front portion 30a has a greater thickness Tf than a thickness Tb of the rear portion 30b. As shown in FIGS. 2 and 3, an outer shell 31 of the airbag 30 includes a vehicle-side wall 32 which is provided with a round inlet port 34 of an inflation gas at the central portion and supported by an upper surface RP of the rim R of the steering wheel W at airbag deployment, and a driver-side wall 39 whose outer circumferential edge 40 is continuous with an outer circumferential edge 33 of the vehicle-side wall 32, and which is opposed to the vehicle-side wall 32 and covers the inlet port 34.

Figure 4:
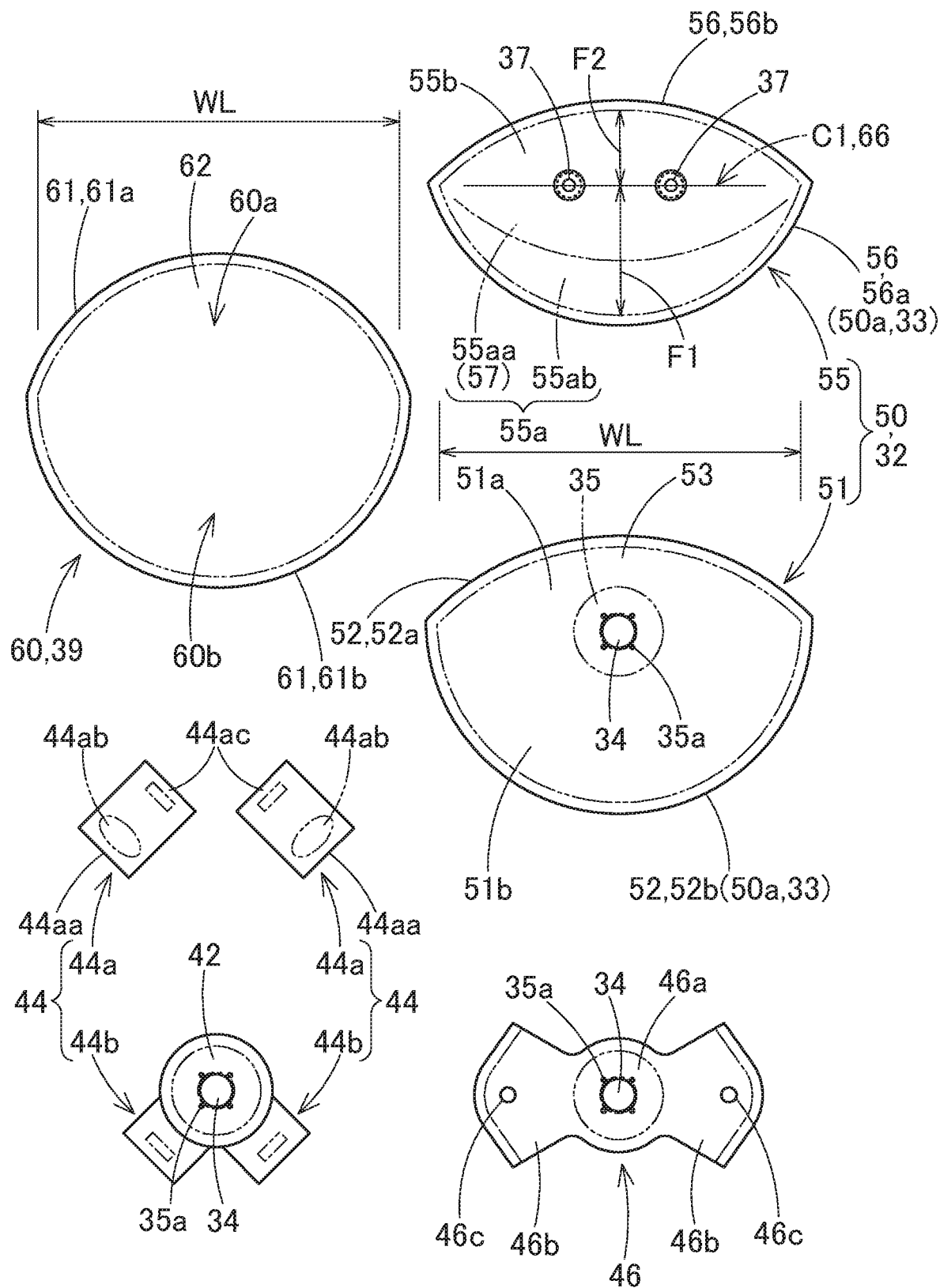
FIG. 4 depicts components of the airbag of FIG. 3 in plan.

A peripheral portion of the inlet port 34 in the vehicle-side wall 32 serves as a mounting portion 35 to the bag holder 11. The mounting portion 35 is provided with four through holes 35a for receiving the bolts 27 of the retainer 25, as can be seen in FIGS. 2 to 4. The mounting portion 35 is a generally square annular portion which is fixed to the mounting seat 12c of the bag holder 11 with its inner side abutted against an underside of the bottom wall 26 of the retainer 25.

Referring to FIG. 4, the outer shell 31 of the airbag 30 is composed of a driver-side base cloth 60 for forming the driver-side wall 39, and a vehicle-side base cloth 50 for forming the vehicle-side wall 32. The vehicle-side base cloth 50 includes a rear-side component 51 provided with the inlet port 34 and a front-side component 55 whose rear edge 56b is joined with a front edge 52a of the rear-side component 51. These base cloth 60 and base cloth components 51, 55 are composed of a fabric of such synthetic resin as polyamide, polyester or the like.

The driver-side base cloth 60 has a generally circular shape which includes a circular segment portion 60a disposed in the front side and a semicircular portion 60b disposed in the rear side. An outer circumferential edge 61 of the driver-side base cloth 60 has a semicircular arc portion 61b in the rear side and a circular arc portion 61a in the front side.

The rear-side component 51 of the vehicle-side base cloth 50 has a generally circular shape which includes a circular segment portion 51a disposed in the front side and a semicircular portion 51b disposed in the rear side. An outer circumferential edge 52 of the rear-side component 51 has a semicircular arc portion 52b in the rear side and a circular arc portion 52a in the front side. The semicircular portion 51b is identical in outer contour to the semicircular portion 60b of the driver-side base cloth 60. The semicircular arc portion 52b, which is an outer circumferential edge of the semicircular portion 51b, is joined (sewn) to the semicircular arc portion 61b which is an outer circumferential edge of the semicircular portion 60b.

The front-side component 55 has a generally elliptical shape including a circular segment portion 55a in the front side and a circular segment portion 55b in the rear side. An outer circumferential edge 56 of the front-side component 55 has a circular arc portion 56a in the front side and a circular arc portion 56b in the rear side. When formed into the outer shell 31 of the airbag 30, the circular arc portion 56a is disposed in the front portion of the airbag 30 and is joined (sewn) to the circular arc portion 61a of the front portion of the driver-side base cloth 60, thus identical in shape with the circular arc portion 61a. Also, when formed into the outer shell 31 of the airbag 30, the circular arc portion 56b of the front-side component 55 is disposed in the rear portion of the front-side component 55 and is joined (sewn) to the front circular arc portion 52a of the rear-side component 51, thus identical in shape with the circular arc portion 52a.

The front-side component 55, rear-side component 51 and driver-side base cloth 60 have an identical width WL in a left and right direction. A width F1 in a front and rear direction of a front portion of the front-side component 55 which is disposed farther to the front than a straight line C1 which connects left and right ends of the front-side component 55 is greater than a width F2 in a front and rear direction of a rear portion of the front-side component 55 which is disposed farther to the rear than the straight line C1. Accordingly, when the front-side component 55 is double-folded on the straight line C1 (i.e. on a crease 66 shown in FIG. 4), the front circular segment portion 55a has an inner portion 55aa which overlaps with the rear circular segment portion 55b, and a protruding portion 55ab which protrudes from the rear circular segment portion 55b. As will be described later, the crease 66 serves as a crease for forming a later-described initial folded form 78 of the airbag 30, and the inner portion 55aa and the rear circular segment portion 55b form a later-described folded-in portion 65 of the initial folded form 78. The protruding portion 55ab forms a later-described folded-back portion 76 together with the front edge portion 62 of the driver-side base cloth 60.

The airbag 30 further includes two vent holes 37 in the front-side component 55 of the vehicle-side wall 32.

Moreover, the airbag 30 internally includes two tethers 44 for limiting a thickness Tb (see (B) of FIG. 10) of the rear portion 30b as inflated. The tethers 44 are disposed side by side in the left and right direction of the airbag 30. As can be seen in FIG. 4, each of the tethers 44 is formed by coupling an upper portion 44a which is joined to the driver-side wall 39 and a lower portion 44b which extends from the peripheral portion of the inlet port 34 of the vehicle-side wall 32. Each of the upper portions 44a is joined to the driver-side wall 39 by the upper end 44aa with a seam 44ab having an elliptical shape. Each of the lower portions 44b extends from a reinforcing cloth 42 for enhancing heat resistance of the peripheral portion of the inlet port 34, and is coupled with a lower end 44ac of the upper portion 44a, thus forming the tether 44.

Since the front-side component 55 is disposed in front of the inlet port 34, the vehicle-side wall 32 has a greater film length in the front and rear direction than the driver-side wall 39 in the front portion 30a of the airbag 30. Also because the tethers 44 are disposed in the rear portion 30b so as to limit the thickness Tb of the rear portion 30b, the thickness Tf of the front portion 30a will be greater than the thickness Tb of the rear portion 30b as can be seen in (B) of FIG. 10 when the airbag 30 is inflated on the upper surface RP of the rim R of the steering wheel W, so that the driver-side wall 39 is deployed generally vertically, which is suitable for restraining the driver D.

The airbag 30 further internally includes a redirecting cloth 46 which redirects an inflation gas as has been fed from the inflator 15 towards the front and rear. As shown in FIG. 4, the redirecting cloth 46 includes a body 46 which is sewn to the peripheral portion of the inlet port 34 and a pair of arms 46b which extend from left and right portion of the body 46a and are sewn together by the leading ends 46b. Each of the arms 46b is provided with an auxiliary opening 46c.

The reinforcing cloth 42 and body 46a of the redirecting cloth 46 also each include an inlet port 34 and through holes 35a.

Production of the airbag 30 is now described. Firstly, the reinforcing cloth 42 and body 46a of the redirecting cloth 46 are sewn to the rear-side component 51 of the vehicle-side base cloth 50 which is not yet provided with the inlet port 34 and through holes 35a, then the inlet port 34 and through holes 35a are formed by punching. Two separate reinforcing cloths (reference numeral omitted) for the vent holes 37 are sewn to the front-side component 55 of the vehicle-side base cloth 50 which is not yet provided with the vent holes 37, then the vent holes 37 are formed by punching. The upper ends 44aa of the upper portions 44a of the tethers 44 are each sewn to the driver-side base cloth 60 with the seams 44ab.

Then the vehicle-side base cloth 50 is formed by sewing together the circular arc portion 56b which is the rear edge of the front-side component 55 and the circular arc portion 52a which is the front edge of the rear-side component 51. Subsequently, the vehicle-side base cloth 50 and driver-side base cloth 60 are mated with the outer surfaces facing each other, the semicircular arc portion 52b which is the rear edge of the rear-side component 51 and the semicircular arc portion 61b which is the rear edge of the driver-side base cloth 60 are sewn together as well as the circular arc portion 56a which is the front edge of the front-side component 55 and circular arc portion 61a which is the front edge of the driver-side base cloth 60. Thus the outer shell 31 of the airbag 30 is formed. Thereafter, the airbag 30 is turned inside out via the inlet port 34 so that seam allowances may not be exposed outside, then the lower ends 44ac of the upper portions 44a and lower portions 44b of the tethers 44 are taken out from the inlet port 34, then sewn together, respectively. Likewise, the arms 46b of the redirecting cloth 46 are taken out from the inlet port 34 and sewn together. If then the tethers 44 and redirecting cloth 46 are put back into the airbag 30, the airbag 30 is completed.

The airbag 30 thus produced is firstly folded into an initial folded form 78, then folded into a complete folded form or airbag package 80.

Figure 5:
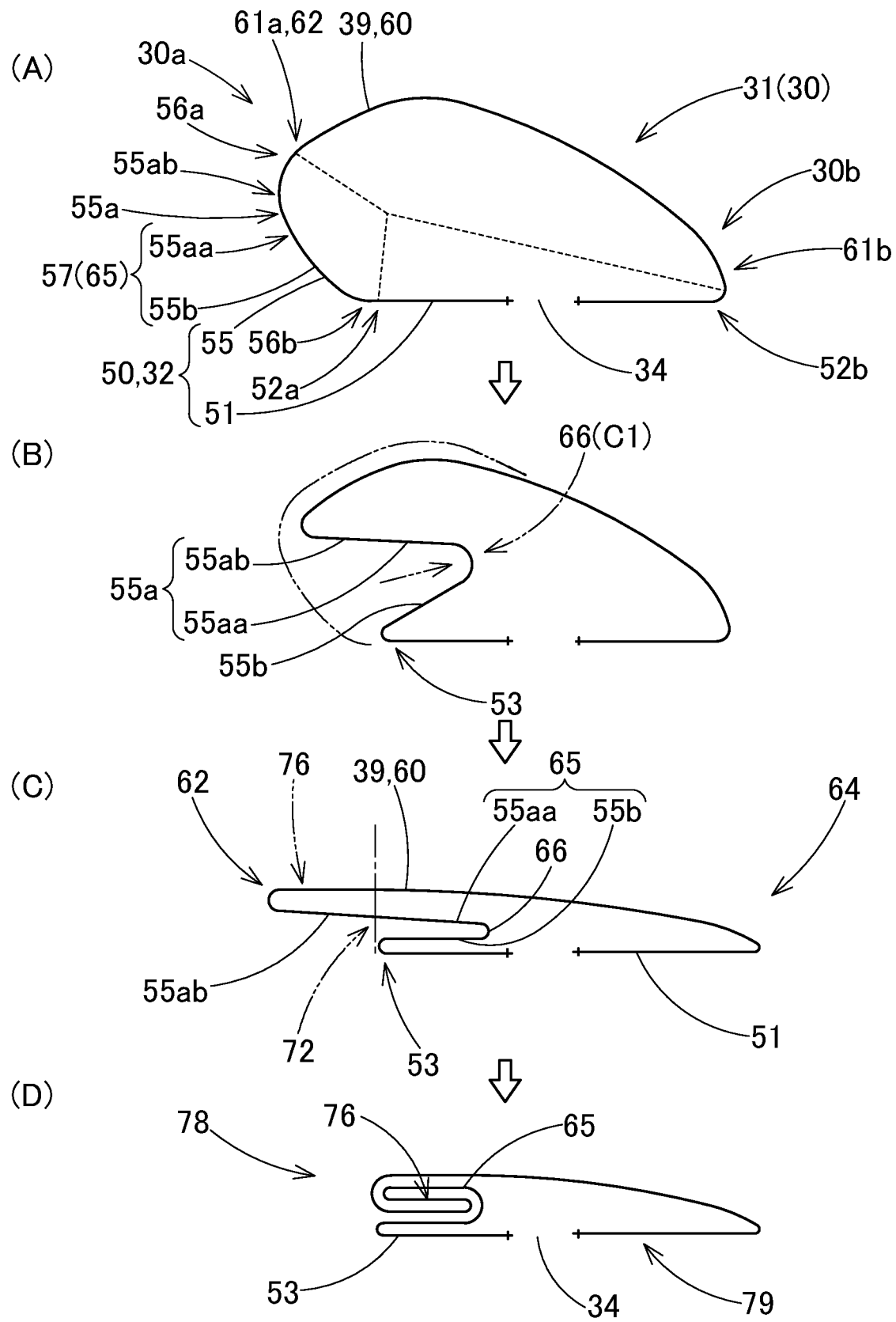
FIG. 5 illustrates a folding process for forming an initial folded form of the airbag of FIG. 3 in schematic vertical section.

To form the initial folded form 78, a preparatory form 64 shown in (C) of FIG. 5 is formed firstly. To form the preparatory form 64, the front-side component 55 of the vehicle-side base cloth 50 forming the vehicle-side wall 32 is folded in an invaginating fashion on a crease 66 which extends in the left and right direction as can be seen in (A) to (C) of FIG. 5 and (A) and (B) of FIG. 6, then the driver-side wall 39 is placed over the vehicle-side wall 32 flatly. Specifically, the front-side component 55, i.e, the front edge portion of the vehicle-side wall 32 forming the front portion 30a of the airbag 30 as deployed, is folded towards the inlet port 34, i.e. rearwardly, beneath the front edge portion 62 of the driver-side wall 39. This front-side component 55 as thus folded inward forms a folded-in portion 65. In the preparatory form 64, referring to (C) of FIG. 5, the folded-in portion 65 lies beneath the front edge portion 62 of the driver-side wall 39 as laid flat. More particularly, the crease 66 of the folded-in portion 65 is formed on the boundary between the front circular segment portion 55a and rear circular segment portion 55b of the front-side component 55, i.e. on the straight line C1 (FIG. 4). The rear circular segment portion 55b lies in the lower side, and the inner portion 55aa of the front circular segment portion 55a lies on and overlaps with the rear circular segment portion 55b.

Figure 6:
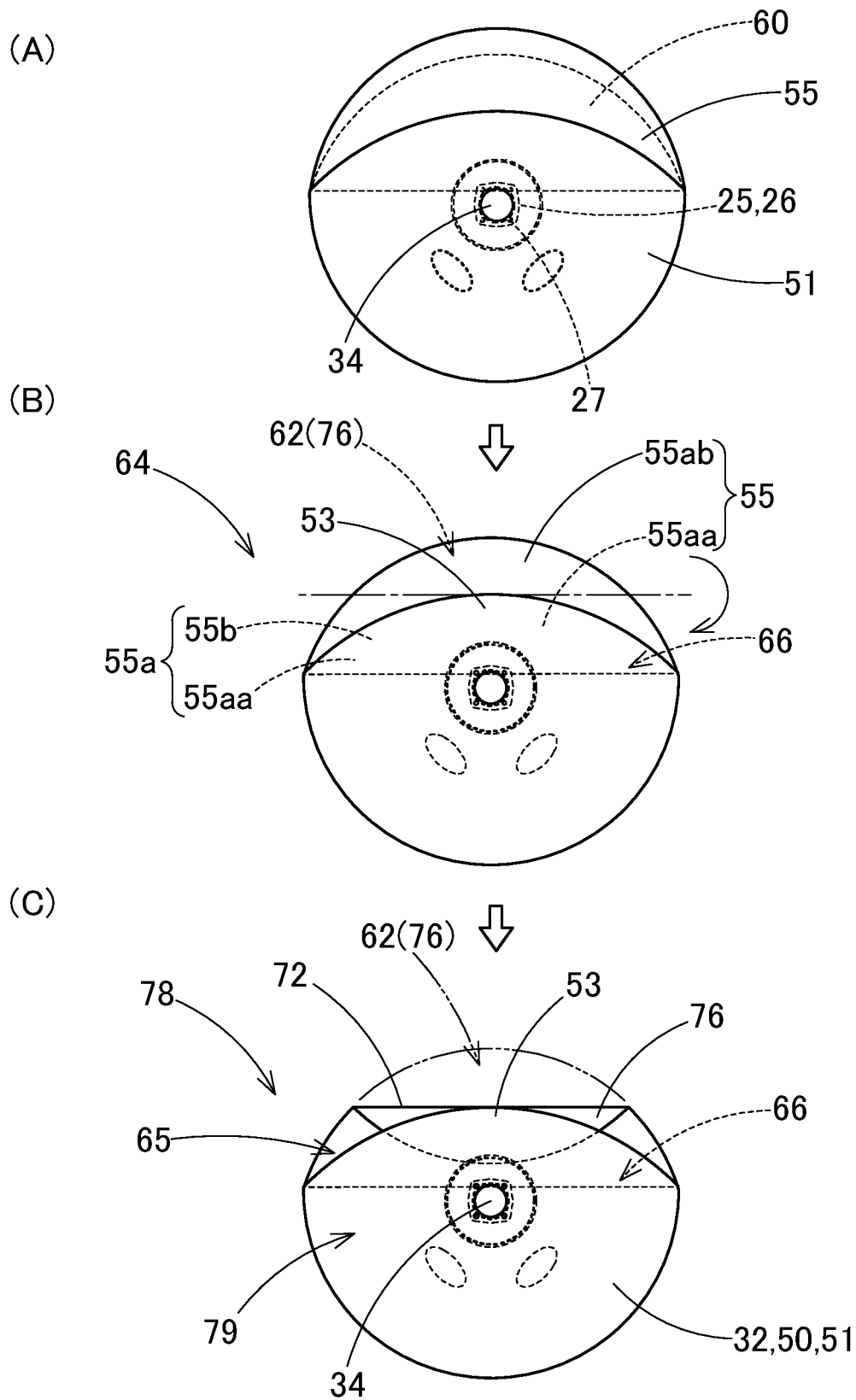
FIG. 6 illustrates the folding process of the initial folded form of the airbag of FIG. 3 in schematic plan.

Thereafter, as can be seen in (C) and (D) of FIG. 5 and (B) and (C) of FIG. 6, the front edge portion 62 of the driver-side wall 39 which adjoins the folded-in portion 65 of the preparatory form 64 is folded on a crease 72 so as to overlap, in an up and down direction, with a front end portion 53 of the vehicle-side wall 32 (i.e. of the rear-side component 51, in the illustrated embodiment) which adjoins the folded-in portion 65 on the side of the inlet port 34. The front edge portion 62 thus folded back forms a folded-back portion (or folded lap portion) 76. The initial folded form 78 is thus formed. In this specific embodiment, the folded-back portion 76 is formed by folding and placing the front edge portion 62 of the driver-side wall 39 on the upper side of the front end portion 53 of the vehicle-side wall 32 (i.e. of the rear-side component 51).

In advance of folding of the airbag 30, the retainer 25 has been set in the mounting portion 35 of the airbag 30 so that the bolts 27 of the retainer 25 protrude out from the through holes 35a. The folding is conducted on the airbag 30 thus assembled with the retainer 25.

Figure 7:
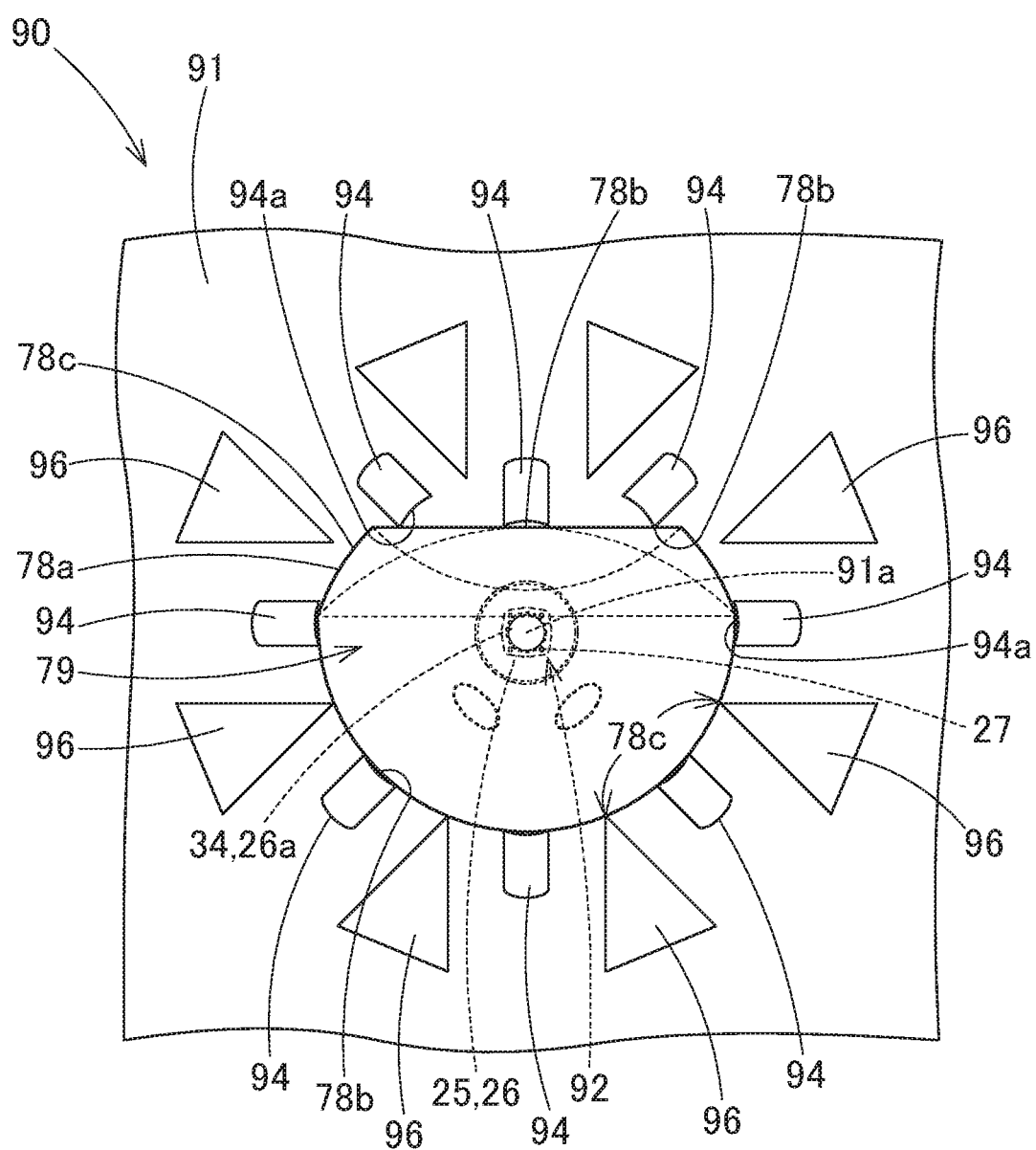
FIGS. 7 and 8 illustrate a radial folding for mi g a completely folded airbag package in schematic plan.
Figure 8:
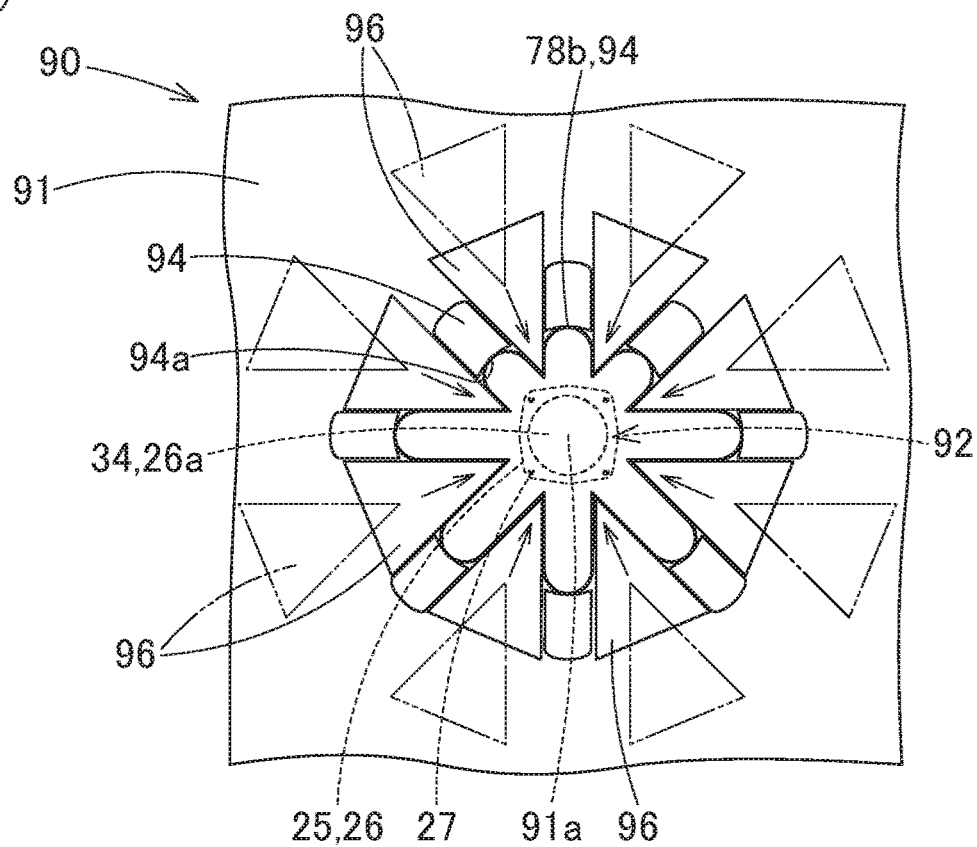
Figure 8:
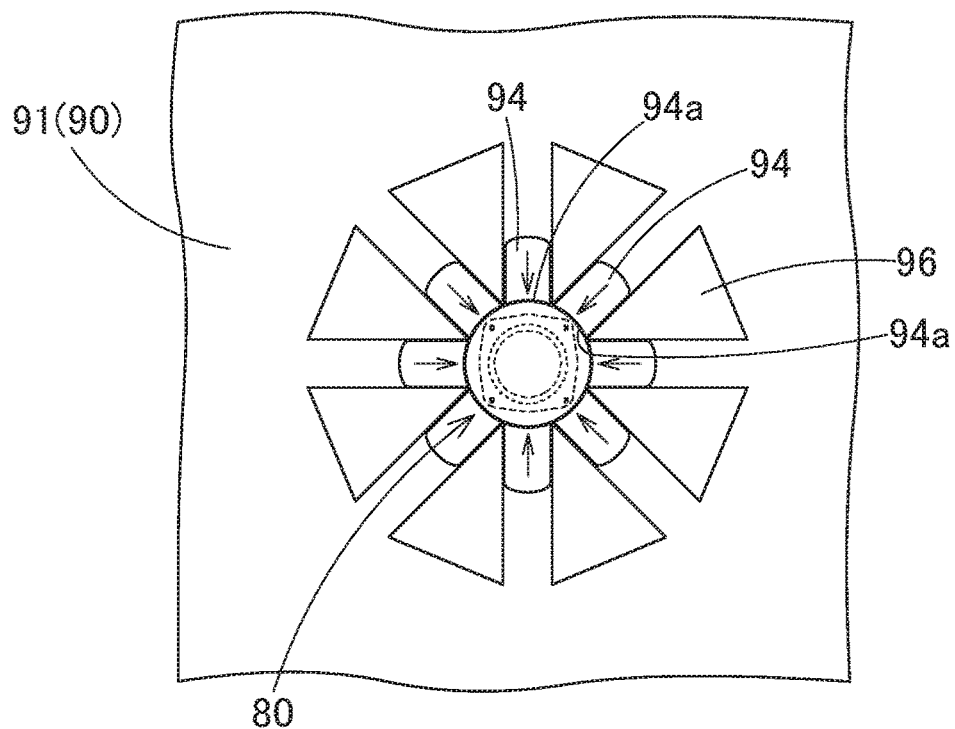

The complete folded form (i.e. airbag package) 80 is formed by applying radial folding to the initial folded form 78, as illustrated in FIGS. 7 and 8. The radial folding is a method of folding that brings a plurality of sector-shaped portions of the initial folded form 78, each of which extends from the inlet port 34 to the outer peripheral edge 78a (FIG.

7), close to the inlet port 34 so that a generally annular circumjacent portion 79 of the initial folded form 78 which is disposed between the inlet port 34 and outer peripheral edge 78a gathers together above and in a vicinity of the inlet port 34. In this specific embodiment, sixteen portions radially disposed about the inlet port 34 are gathered up towards the inlet port 34.

A bag-folding device 90 shown in FIGS. 7 and 8 is used to conduct the radial folding. The bag-holding device 90 includes a base plate (or bottom base plate) 91 and two kinds of eight pushing jigs 94 and 96 which are disposed on the base plate 91 and configured to move towards the center of the base plate 91. The base plate 91 includes, at the center 91a of the upper side, a setting section 92 in which the bolts 27 of the retainer 25 protruding from the initial folded form 78 are set.

The eight pushing jigs 94 are configured to grip eight portions 78b in the outer peripheral edge 78a of the initial folded form 78 and push or cram the same towards the center 91a of the base plate 91, as can be seen in FIG. 8. Each of the pushing jigs 94 is provided, in the surface facing towards the setting section 92, a forming surface 94a which is shaped to correspond to a curved surface of an outer circumference of the generally pot-like shaped airbag package 80. Each of the pushing jigs 96 is formed into a generally triangular plate which is tapered towards the setting section 92.

Although not illustrated in the drawings, the bag-folding device 90 further includes a ceiling base plate which regulates the height of the initial folded form 78 and helps form the airbag package 80 in a generally pot-like shape when the initial folded form 78 is compacted by the pushing jigs 94 and 96.

Operation of the bag-folding device 90 is now described. The airbag 30 in the initial folded form 78 is placed on the bottom base plate 91 by setting the bolts 27 in the setting section 92, then the not-shown ceiling base plate is positioned at a predetermined height from the setting section 92 of the bottom base plate 91 (at the same height as that of the airbag package 80). Then as shown in FIG. 7, the pushing jigs 94 and 96 are moved towards the setting section 92 from farther positions so that the pushing jigs 94 grip predetermined eight grip portions 78b of the outer peripheral edge 78a of the initial folded form 78. Thereafter, as can be seen in (A) of FIG. 8, the pushing jigs 96 are firstly moved towards the setting section 92 (i.e. towards the inlet port 34) to push or compress eight pushing portions 78c (FIG. 7) of the outer peripheral edge 78a of the initial folded form 78 towards the setting section 92, leaving the grip portions 78b gripped by the pushing jigs 94 as they are. Subsequently, the grip portions 78b are released from gripping by the pushing jigs 94, then the pushing jigs 94 are moved towards the setting section 92 to cram the eight portions 78b towards the setting section 92, as shown in (B) of FIG. 8, Thus the airbag package 80, which has a pot-like shape, is formed.

In order to keep the folded-up configuration, a shape-keeping treatment is applied to the airbag package 80 as folded up as described above. Specifically, the airbag package 80 is firstly subjected to hot compression molding using a heated mold, then subjected to cold compression molding using a mold of normal temperature.

After undergoing the shape-keeping treatment, the airbag package 80 is wrapped by a not-shown wrapping member. Assembling of the airbag device 10 using the airbag package 80 is now described. Firstly, the airbag package 80 is set inside the side wall 22 of the airbag cover 20. Then the supporting wall 13 of the bag holder 11 and the side wall 20 of the airbag cover 20 are coupled by inserting the bolts 27 of the retainer 25 protruding from the airbag package 80 through the through holes 12b of the bag holder 11, bringing the connecting edge portions 22a of the airbag cover 22 into engagement with the retaining portions 13a of the bag holder 11, and inserting the rivets 23 through the connecting holes 13b and 22b. Subsequently, the body 16 of the inflator 15 is set in the insert hole 12a of the bag holder 11 from below such that the bolts 27 of the retainer 25 protruding from the bag holder 11 penetrate the flange 17 of the inflator 15. If then the bolts 27 are fastened with not-shown nuts, the airbag package 80 and inflator 15 are secured to the bag holder 11 which has been coupled with the airbag cover 20. Thus the airbag device 10 is assembled.

The airbag device 10 thus assembled is mounted on the wheel body 1 of the steering wheel W which has been mounted on the steering shaft SS, with the use of not-shown mounting brackets extending from the bag holder 11. Thus the steering wheel W is completed as well as the airbag device 10 is mounted on the vehicle together with the steering wheel W.

When the airbag device 10 is mounted on the wheel body 1 of the steering wheel W, not-shown lead wires are connected to the inflator 15 for feeding of an actuating signal.

When an actuating signal is fed to the inflator 15 of the airbag device 10 as mounted on board, the inflator 15 emits an inflation gas G from the gas discharge ports 16a, so that the airbag 30 is inflated with the gas G, breaks the not-shown wrapping member, pushes and opens the doors 21a of the ceiling wall 21 of the airbag cover 20, then protrudes from an opening formed by opening of the doors 21a. Thus the airbag 30 is deployed over an upper surface of the boss section B and the upper surface RP of the rim R, as indicated with dashed-and-double-dotted lines in FIGS. 1 and 2.

Figure 9:
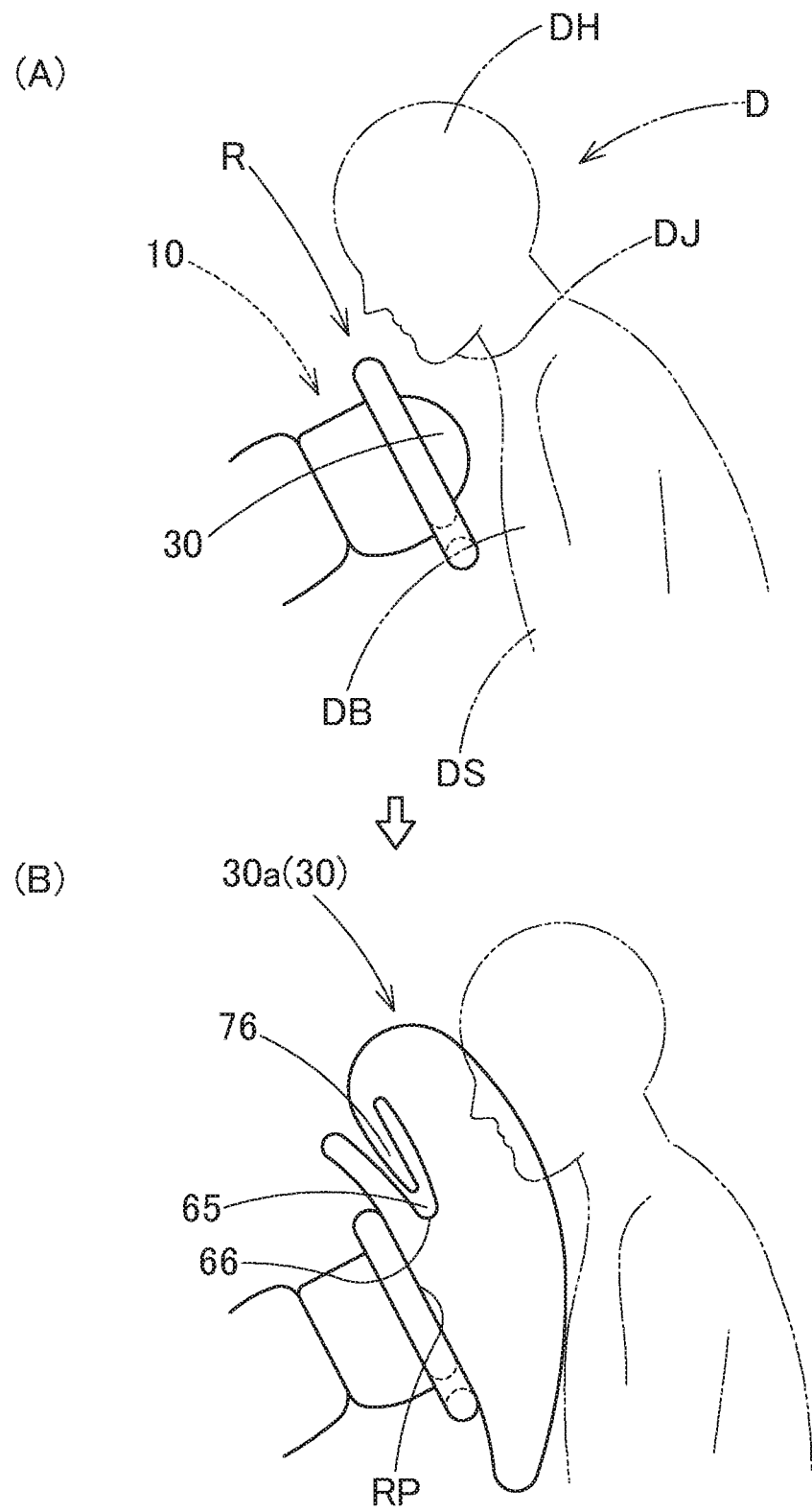
FIGS. 9 and 10 illustrate the way the airbag device in accordance with the exemplary embodiment operates when actuated.

When the airbag device 10 of the exemplary embodiment is actuated, the airbag 30 unfolds generally in a reverse order to the order of folding processes. In the final stage of unfolding, the folded-back portion 76 in the initial folded form 78 of the airbag 30, i.e. the front edge portion 62 of the driver-side wall 39, unfolds forward while the folded-in portion 65 unfolds forward. Accordingly, as can be seen in (A) and (B) of FIG. 9, even if the head DH of the driver D is positioned in proximity to the rim R at airbag deployment, in the front portion 30a, the airbag 30 deploys the folded-back portion 76 forward while going into a space between the head DH and upper surface RP of the rim R, and the folded-in portion 65 unfolds forward and increases in thickness (see (B) of FIG. 9 and (A) of FIG. 10). As a result, the airbag 30 is able to restrain and protect the head DH of the driver D above the upper surface RP of the rim R, without being deployed under the chin DJ of the driver D. If the airbag 30 is further inflated as shown in FIG. 10, it makes an advance into a space between the upper surface RP of the rim R and thorax DB and abdomen DS as well, thus the airbag 30 as fully deployed restrains and protects the head DH, thorax DB and abdomen DS of the driver D adequately.

Therefore, the airbag device 10 of the exemplary embodiment is able to restrain and protect the driver D positioned in proximity to the steering wheel W adequately with the airbag 30.

In the airbag device 10 of the exemplary embodiment, the airbag 30 in the form of airbag package 80 includes the radial-folded portion in which the circumjacent portion 79 of the initial folded form 78 disposed between the inlet port 34 and outer peripheral edge 78a is gathered together (or compressed) towards the inlet port 34 along a radial direction of the initial folded form 78, by radial folding that brings a plurality of sector-shaped portions of the initial folded form 78 each of which extends from the inlet port 34 to the outer peripheral edge 78a close to the inlet port 34.

In other words, in the airbag package 80 of the airbag device 10 of the exemplary embodiment, the circumjacent portion 79 of the inlet port 34 in the initial folded form 78 of the airbag 30 is generally evenly brought close to the inlet port 34. Accordingly, the airbag package 80 is compact and requires as small storage space as possible in the boss section B of the steering wheel W.

In this specific embodiment, the radial folding is adopted in order to reduce the size of the initial folded form 78 not only in the front, rear, left and right directions but also in diagonal directions intersecting with the front-rear, left and right directions. Alternatively, however, roll-folding method or concertina-folding method may also be adopted in order to bring front, rear, left and right peripheral portions of the outer peripheral edge 78a close to the inlet port 34 and reduce the initial folded form 78 in size in the front-rear, left and right directions.

Moreover, in the airbag device 10 of the exemplary embodiment, the airbag 30 is configured such that the thickness Tf of the front portion 30a as inflated is greater than the thickness Tb of the rear portion 30b as inflated.

With the airbag 30 thus configured, when the airbag 30 as inflated is supported by the upper surface RP of the rim R of the steering wheel W which slopes down towards the rear, the driver-side wall 39 of the airbag 30 is deployed generally upright, thus a generally vertically deployed arresting surface 41 of the driver-side wall 39 is able to restrain from the head DH down to the abdomen DS of the driver D as a whole evenly, and protect him/her without adding him/her a partial reaction force. Therefore, the airbag device 10 is able to exert an improved driver restraint performance.

The difference between the thickness Tf and thickness Tb is formed by providing the front-side component 55 in the vehicle-side base cloth 50 and providing the tethers 44. However, the difference between the thickness Tf of the front portion 30a and thickness Tb of the rear portion 30b may alternatively be formed by merely changing the shape and/or film length of the outer shell 31 of the airbag 30, or merely by tethers.

Of course, the airbag may also be configured such that the front portion and rear portion have similar thicknesses when inflated, on condition that the initial folded form 78 of the airbag has the folded-in portion 65.

The steering wheel W on which the airbag device 10 of the exemplary embodiment is mounted is configured such that the width LF in the front and rear direction of the front portion Rf of the rim R positioned farther forward than the center of the boss section B is smaller than the width LL, LR in the left and right direction of each of the left portion Rl and right portion Rr of the rim R positioned farther to the left or right than the center of the boss section B.

With the steering wheel W thus configured, there seems to be a fear that the front portion Rf of the rim R cannot sufficiently support the airbag 30 as inflated, so that the driver-side wall 39 moves forward. However, since the front portion 30a of the airbag 30 is inflated thicker than the rear portion 30b, the vehicle-side wall 32 is supported by front end portions (or front surfaces) Rlf, Rrf of left portion Rl and right portion Rr of the rim R and/or a front surface Rff of the front portion Rf of the rim R, thus is able to acquire a reaction force. Therefore, an advancing amount of the driver-side wall 39 is suppressed to a similar degree in the front portion 30a and rear portion 30b of the airbag 30, so that the airbag 30 is smoothly able to restrain from the head DH down to the abdomen DS of the driver D generally as a whole softly with the generally vertical arresting surface 41 of the driver-side wall 39 so an arresting stroke is generally even in the whole area from the head DH to abdomen DS.

Moreover, in the airbag device 10 of the exemplary embodiment, the driver-side wall 39 of the outer shell 31 of the airbag 30 is composed of the driver-side base cloth 60 while the vehicle-side wall 32 is composed of the vehicle-side base cloth 50, and the vehicle-side base cloth 50 includes the rear-side component 51 which is provided with the inlet port 34 and the front-side component 55 which includes the portion 57 for forming the folded-in portion 65. The rear edge (circular arc portion) 56b of the front-side component 55 is joined to the front edge (circular arc portion) 52a of the rear-side base cloth 51. The outer shell 31 of the airbag 30 is formed by joining the outer circumferential edge 50a of the vehicle-side base cloth 50 (i.e. the outer circumferential edge 33 of the vehicle-side wall 32) and outer circumferential edge 61 of the driver-side base cloth 60 (i.e. the outer circumferential edge 40 of the driver-side wall 39) together.

With this configuration, when the airbag 30 is formed into the initial folded form 78, the folded-in portion 65 is easily formed by folding and invaginating the front-side component 55 of the vehicle-side wall 32 towards the inlet port 34 on the crease 66 while laying the driver-side base cloth 60 over the rear-side component 51 of the vehicle-side wall 32, then the folded-back portion 76 is also easily formed by turning the front edge portion 62 of the driver-side base cloth 60 which is disposed farther towards the front than the front edge 52a of the rear-side component 51 so as to overlap with the front edge 52a (i.e. front end portion 53) of the rear-side component 51 in the up and down direction. That is, with the configuration described above, the crease 66 forming the folded-in portion 65 and the crease 72 forming the folded-back portion 76 are easy to form, thus the initial folded form 78 is easy to form. Further, since the outer shell 31 of the airbag 30 is composed of three base cloths, the driver-side base cloth 60 forming the driver-side wall 39 and rear-side component 51 and front-side component 55 forming the vehicle-side wall 32, the airbag 30 can be formed of only a limited number of components.

Alternatively, the airbag provided with the folded-in portion 65 may also be composed of a three-dimensional airbag formed by three-dimensional sewing, instead of forming the airbag by planar sewing of the three planar base cloth 51, 55 and 60.

Figure 11:
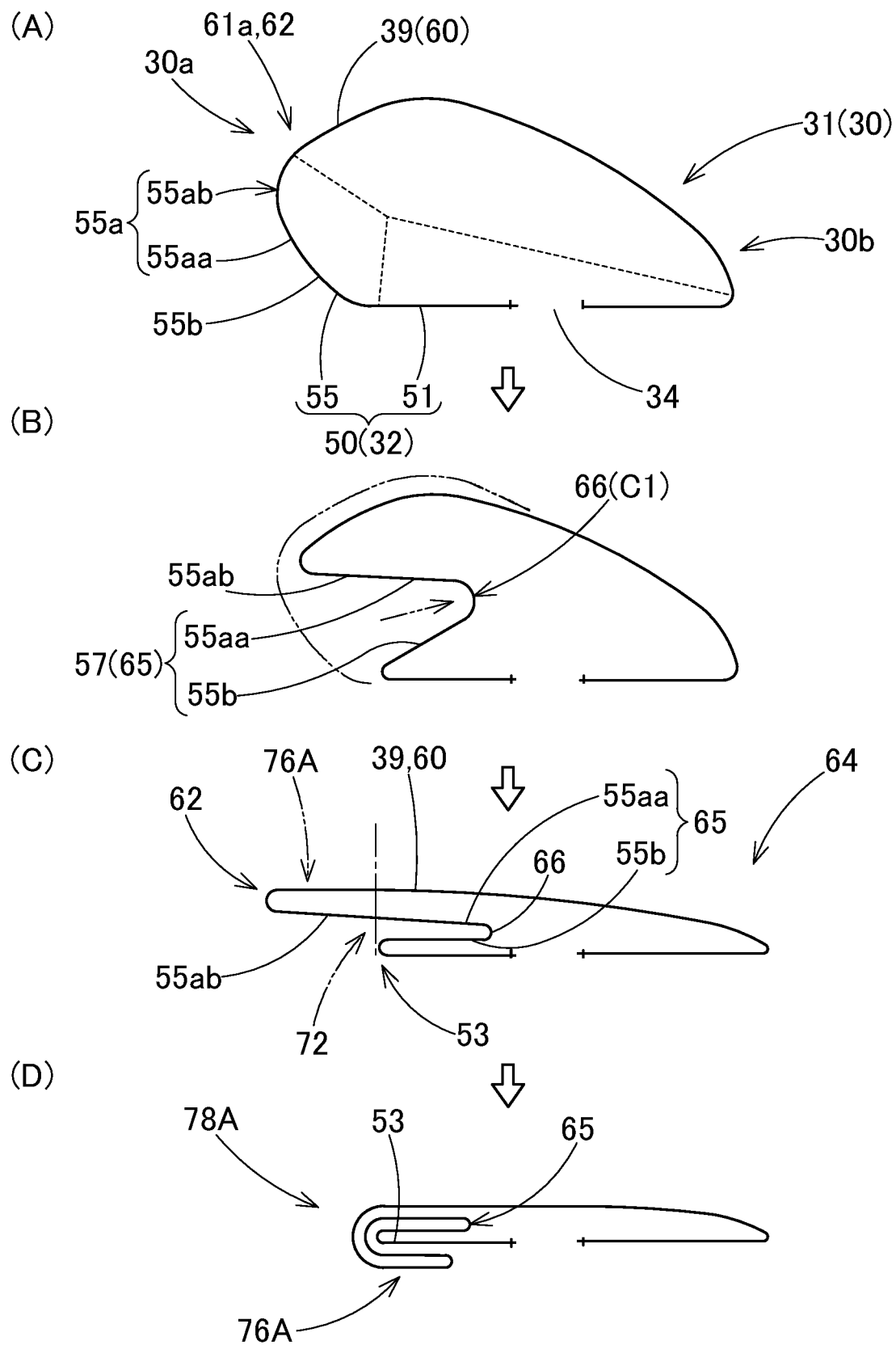
FIG. 11 illustrates a folding process for forming an initial folded form of an airbag of an alternative embodiment in schematic vertical section.
Figure 12:
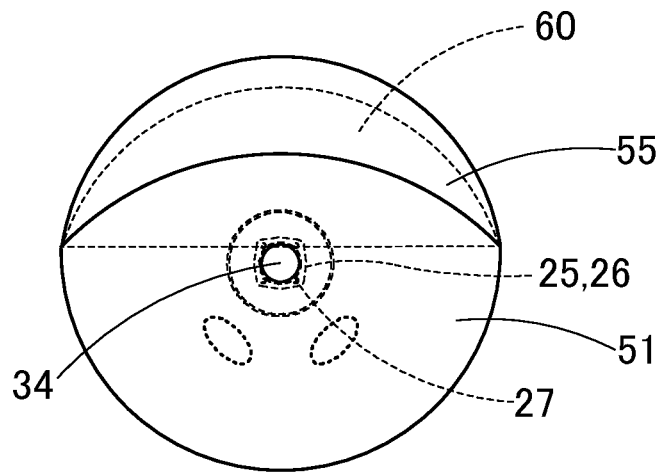
FIG. 12 illustrates the folding process of FIG. 11 in schematic plan.
Figure 12:
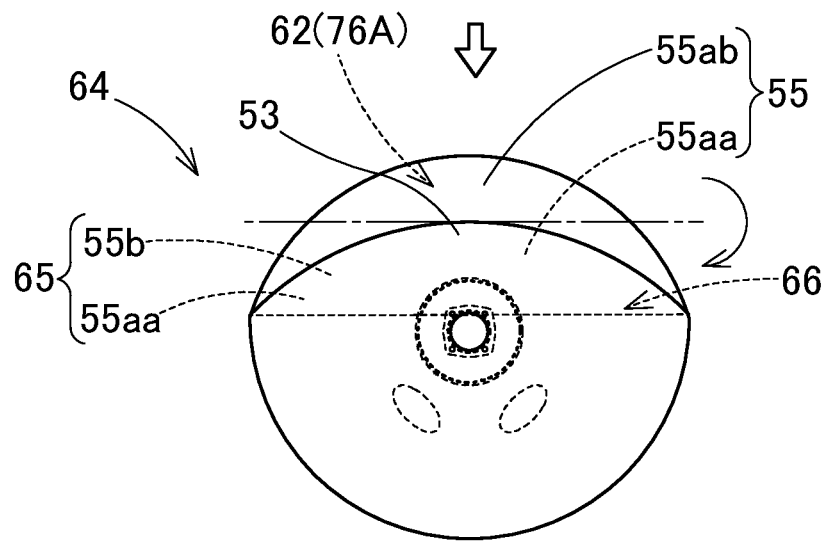
Figure 12:
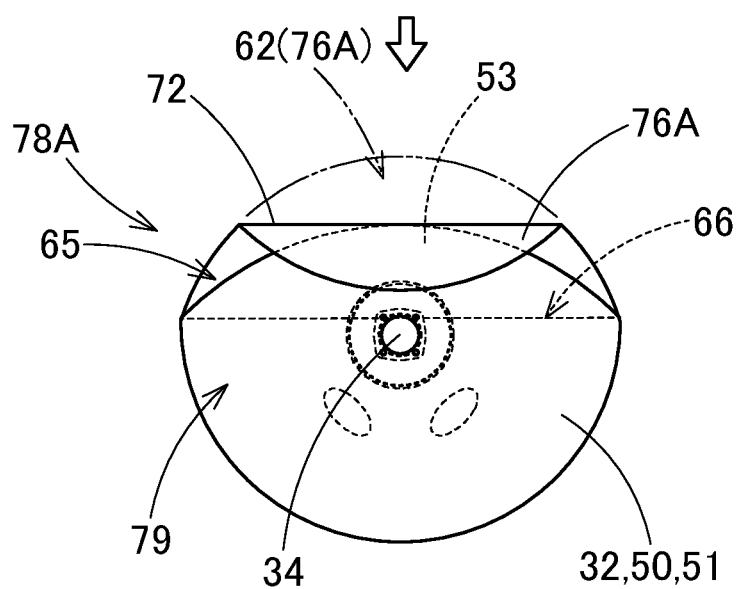

In the foregoing embodiment, the folded-back portion (or folded lap portion) 76 of the initial folded form 78 of the airbag 30 is formed such that the front edge portion 62 of the driver-side wall 39 which adjoins the folded-in portion 65 lies on the front end portion 53 of the vehicle-side wall 32 which extends from the inlet port 34 and adjoins the folded-in portion 65. Alternatively, the folded-back portion of the initial folded form of the airbag may be configured such that the front edge portion 62 of the driver-side wall 39 which adjoins the folded-in portion 65 lies beneath the front end portion 53 of the vehicle-side wall 32 which extends from the inlet port 34 and adjoins the folded-in portion 65, as in a folded-back portion (or folded lap portion) 76A of an initial folded form 78A of the airbag 30 shown in FIGS. 11 and 12.

Figure 13:
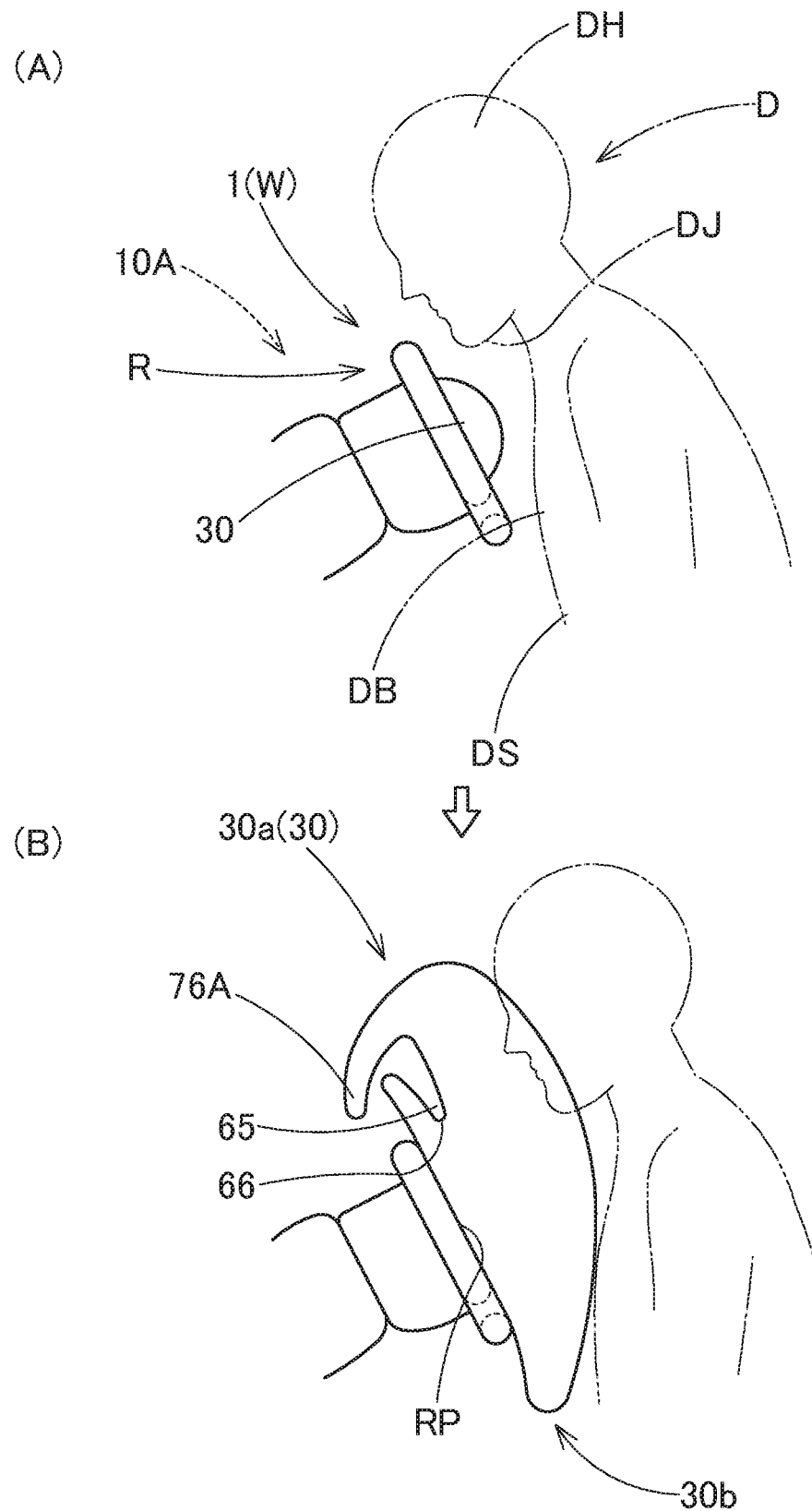
FIGS. 13 and 14 illustrate the way the airbag device which employs the airbag of FIG. 11 operates when actuated.
Figure 14:
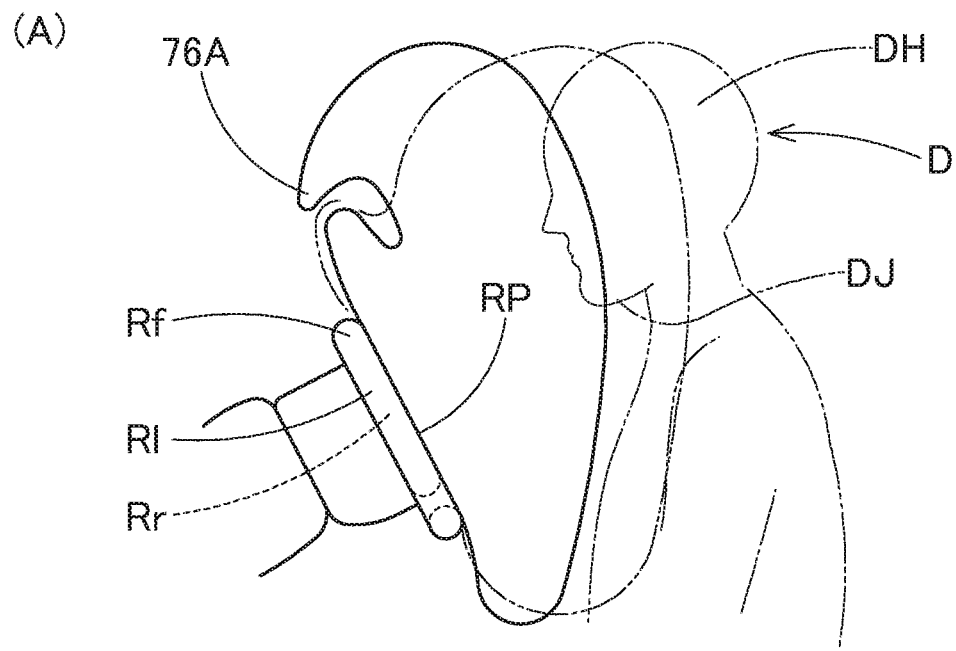
Figure 14:
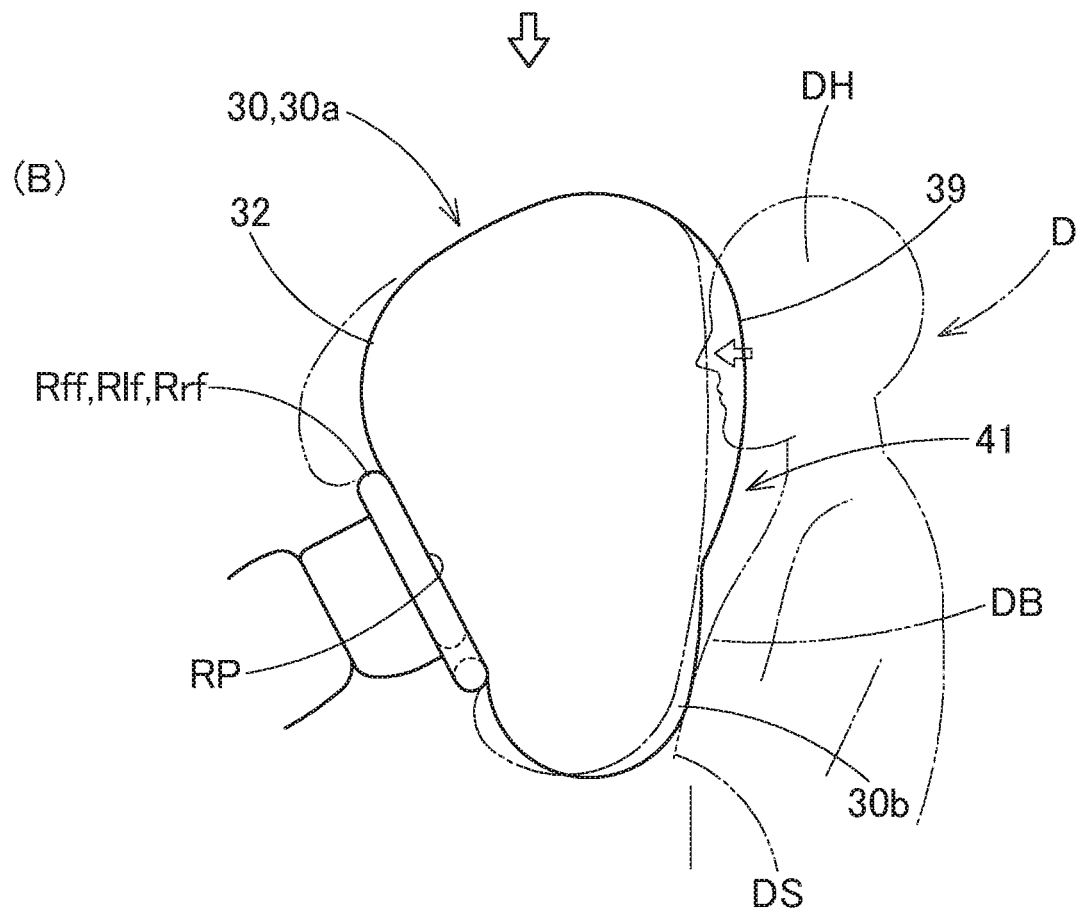

If the airbag 30 having the initial folded form 78A described above is further folded by radial folding, assembled into an airbag device 10A and mounted on the steering wheel W, the airbag 30 will be inflated in the same manner as the foregoing embodiment, as can be seen in FIGS. 13 and 14.

More specifically, when the airbag device 10A is actuated, the airbag 30 unfolds generally in a reverse order to the order of folding processes. In the final stage of unfolding, the folded-back portion 76A in the initial folded form 78A of the airbag 30, i.e. the front edge portion 62 of the driver-side wall 39, unfolds forward while the folded-in portion 65 unfolds forward. Accordingly, as can be seen in (A) and (B) of FIG. 13, even if the head DH of the driver D is positioned in proximity to the rim R at airbag deployment, in the front portion 30a, the airbag 30 deploys the folded-back portion 76A forward while going into a space between the head DH and upper surface RP of the rim R, and the folded-in portion 65 unfolds forward and increases in thickness (see (B) of FIG. 13 and (A) of FIG. 14). As a result, the airbag 30 is able to restrain and protect the head DH of the driver D above the upper surface RP of the rim R, without being deployed under the chin DJ of the driver D. If the airbag 30 is further inflated as shown in FIG. 14, it makes an advance into a space between the upper surface RP of the rim R and thorax DB and abdomen DS as well, thus the airbag 30 as fully deployed restrains and protects the head DH, thorax DB and abdomen DS of the driver D adequately.

Figure 15:
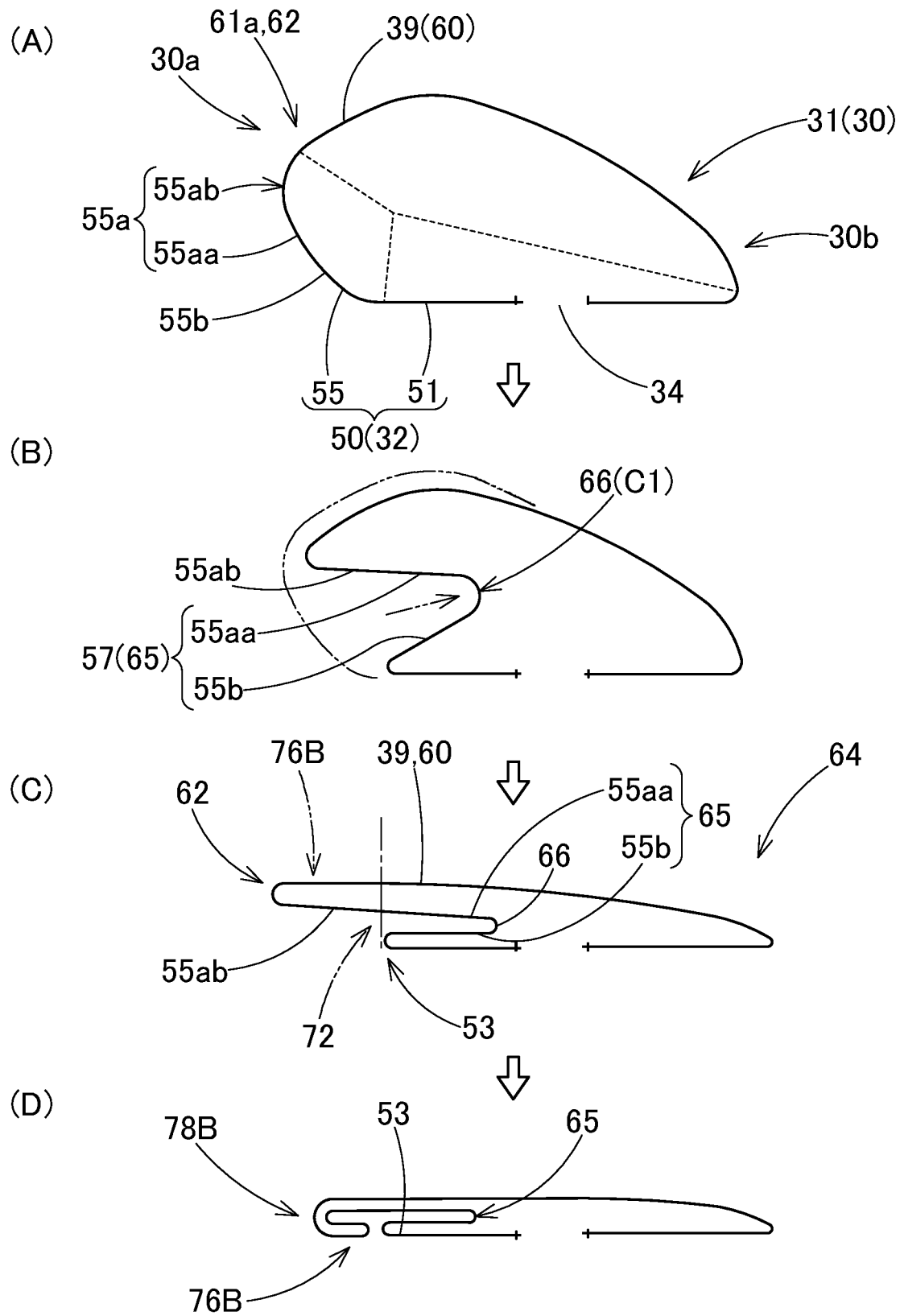
FIG. 15 illustrates a folding process for forming an initial folded form of an airbag of another alternative embodiment in schematic vertical section.
Figure 16:
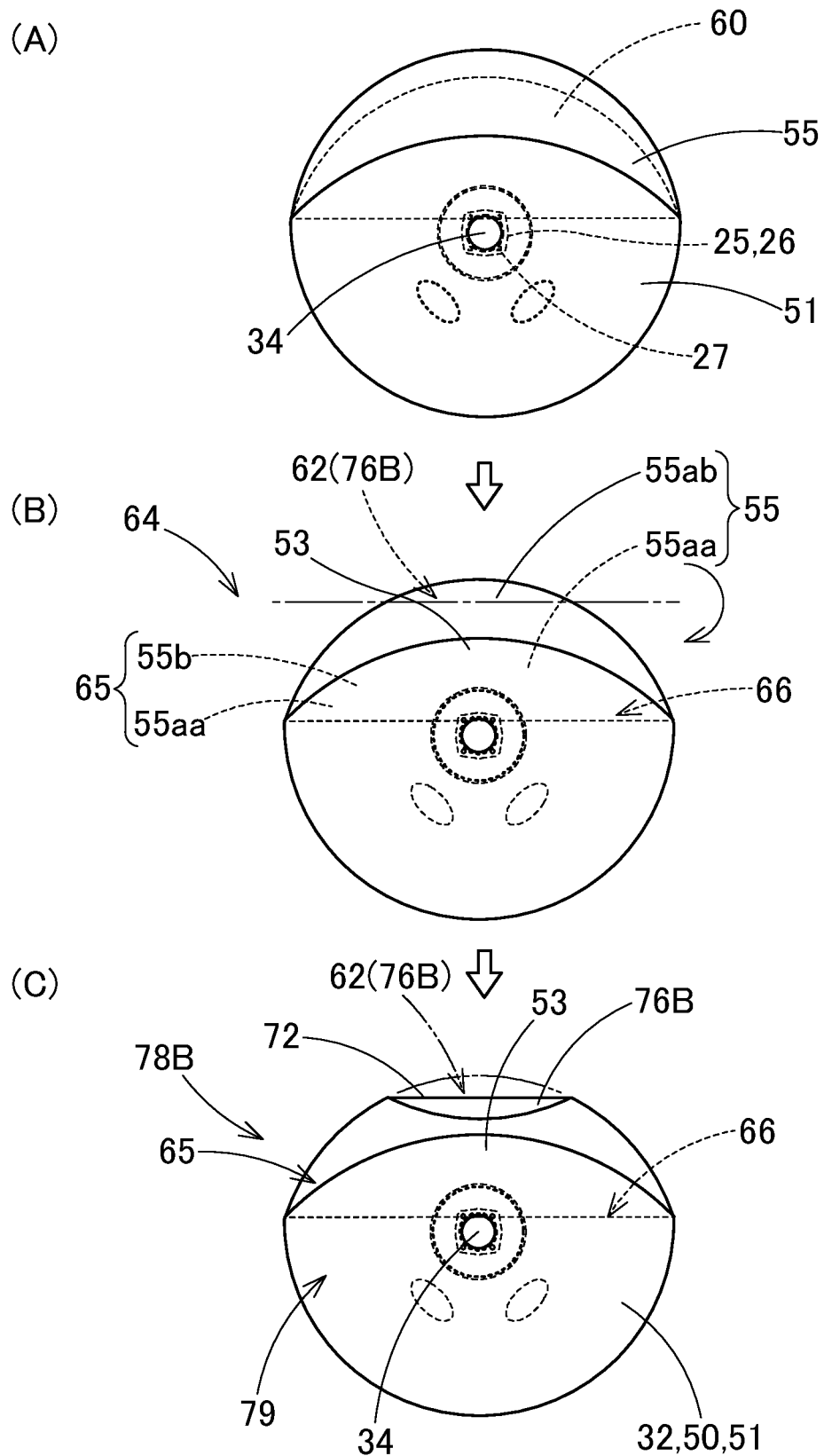
FIG. 16 illustrates the folding process of FIG. 15 in schematic plan.

Further alternatively, the folded-back portion may also be formed by merely folding the front edge portion 62 of the driver-side wall 39 which adjoins the folded-in portion 65 towards the front end portion 53 of the vehicle-side wall 32 which extends from the inlet port 34 and adjoins the folded-in portion 65, instead of placing it on or beneath the front end portion 53 of the vehicle-side wall 32 in an overlapping fashion. In an initial folded form 78B of the airbag 30 shown in FIGS. 15 and 16, a folded-back portion 76B is configured such that the front edge portion 62 of the driver-side wall 39 which adjoins the folded-in portion 65 is folded and disposed close to the front end portion 53 of the vehicle-side wall 32 which extends from the inlet port 34 and adjoins the folded-in portion 65.

Figure 17:
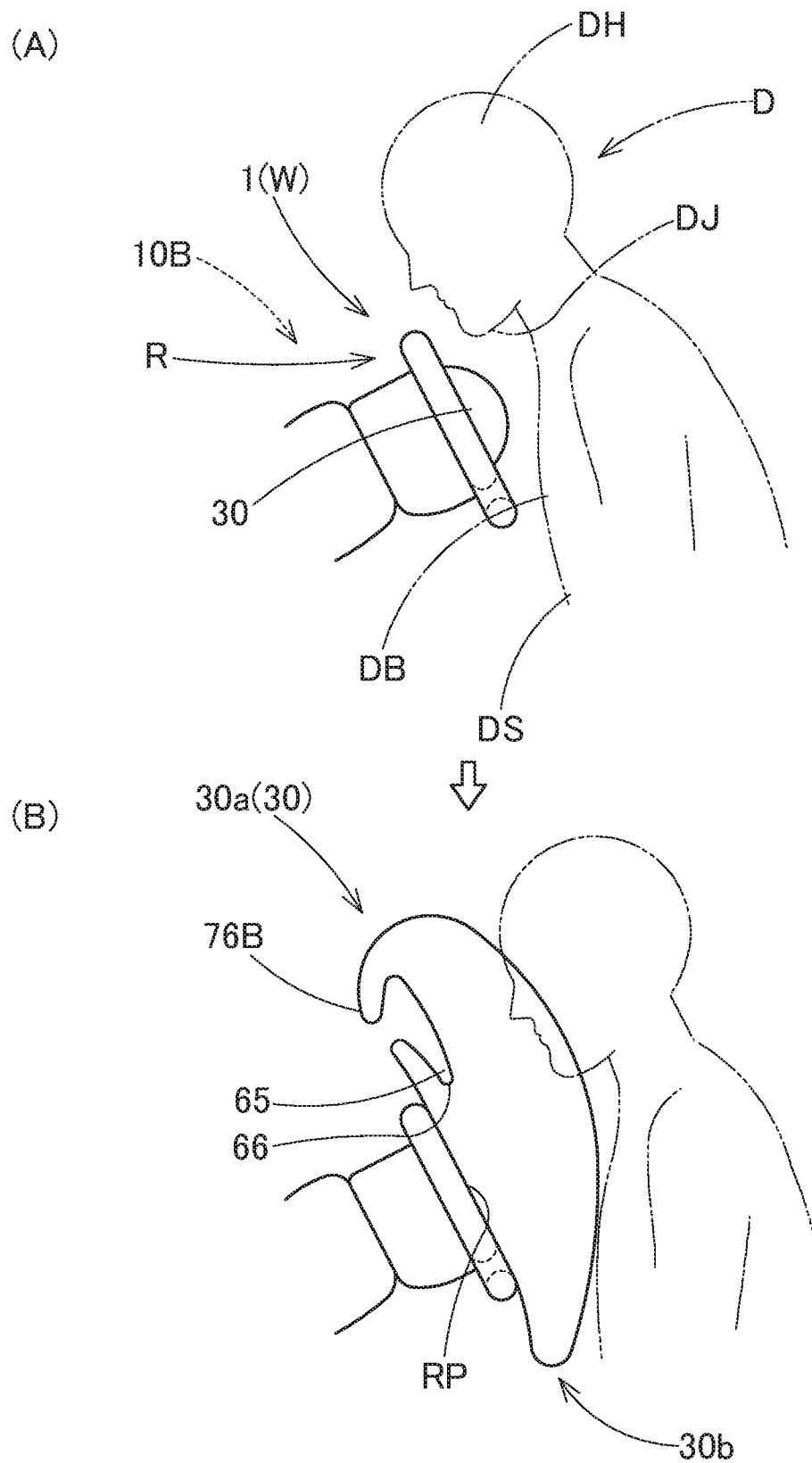
FIGS. 17 and 18 illustrate the way the airbag device which employs the airbag of FIG. 15 operates when actuated.
Figure 18:
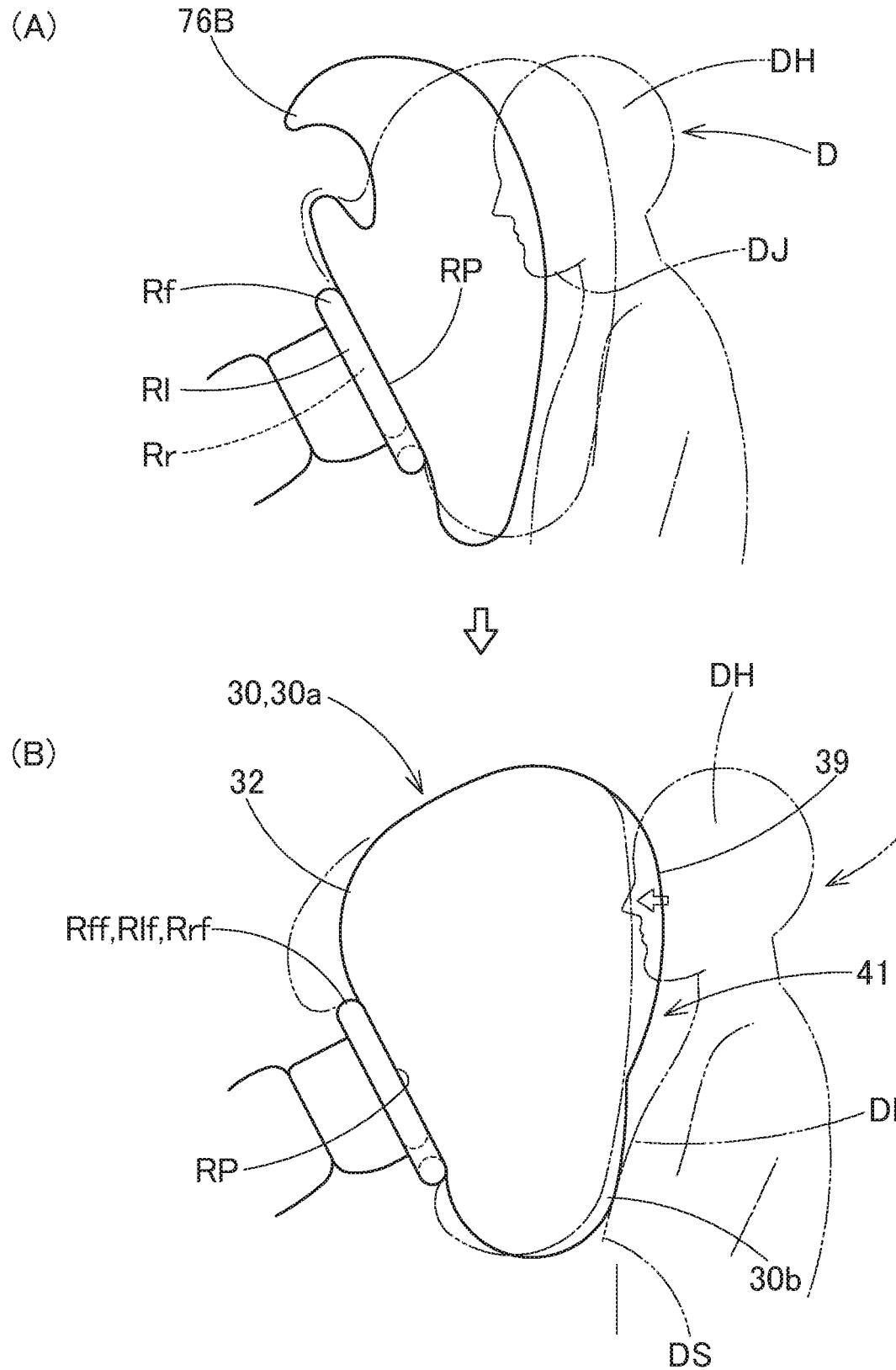

If the airbag 30 having the initial folded form 78B described above is further folded by radial folding, assembled into an airbag device 10B and mounted on the steering wheel W, the airbag 30 will be inflated in the same manner as the foregoing embodiments, as can be seen in FIGS. 17 and 18.

More specifically, when the airbag device 10B is actuated, the airbag 30 unfolds generally in a reverse order to the order of folding processes. In the final stage of unfolding, the folded-back portion 76B in the initial folded form 78B of the airbag 30, i.e. the front edge portion 62 of the driver-side wall 39, unfolds forward while the folded-in portion 65 unfolds forward. Accordingly, as can be seen in (A) and (B) of FIG. 17, even if the head DH of the driver D is positioned in proximity to the rim R at airbag deployment, in the front portion 30a, the airbag 30 deploys the folded-back portion 76B forward while going into a space between the head DH and upper surface RP of the rim R, and the folded-in portion 65 unfolds forward and increases in thickness (see (B) of FIG. 17 and (A) of FIG. 18). As a result, the airbag 30 is able to restrain and protect the head DH of the driver D above the upper surface RP of the rim R, without being deployed under the chin DJ of the driver D. If the airbag 30 is further inflated as shown in FIG. 18, it makes an advance into a space between the upper surface RP of the rim R and thorax DB and abdomen DS as well, thus the airbag 30 as fully deployed restrains and protects the head DH, thorax DB and abdomen DS of the driver D adequately.

Especially when the folded-back portion is configured such that the front edge portion 62 of the driver-side wall 39 is folded and disposed close to the front end portion 53 of the vehicle-side wall 32 as in the folded-back portion 76B, the folded-back portion 76B is able to unfold forward more quickly at airbag deployment since it does not overlap with the front end portion 53 of the vehicle-side wall 32, so that the folded-in portion 65 is also able to unfold forward quickly. Therefore, even if the head DH of the driver D is positioned in proximity to the rim R at airbag deployment, the airbag 30 is able to unfold the front portion 30a forward quickly and go into the space between the head DH and upper surface RP of the rim R smoothly.

What is claimed is:

1. An airbag device for a driver's seat adapted to be mounted on a boss section of a steering wheel of a vehicle which boss section is disposed in a vicinity of a center of a rim of the steering wheel for gripping when driving, the airbag device comprising
    an airbag that is folded up in the form of an airbag package so as to be stowed in the boss section, and that is unfoldable and inflatable for protecting a driver,
    wherein an outer shell of the airbag includes:
        a vehicle-side wall that includes an inlet port for introducing an inflation gas in a vicinity of the center thereof, and that is configured to be supported by an upper surface of the rim of the steering wheel when deployed; and
        a driver-side wall for restraining the driver, the driver-side wall extending from an outer circumferential edge of the vehicle-side wall and covering the inlet port;
    wherein the airbag, before folded up into the airbag package, has an initial folded form in which the airbag is folded in a flat fashion such that the driver-side wall lies over the vehicle-side wall;
    wherein the initial folded form of the airbag includes:
        a folded-in portion in which a front edge portion of the vehicle-side wall for forming a front portion of the airbag as deployed is folded inwardly towards the inlet port beneath a front edge portion of the driver-side wall as laid flat; and
        a folded-back portion in which the front edge portion of the driver-side wall which adjoins the folded-in portion is folded towards a front end portion of the vehicle-side wall which extends from the inlet port and adjoins the folded-in portion; and
    wherein the folded-back portion of the initial folded form of the airbag is configured such that the front edge portion of the driver-side wall as folded back does not overlap with the front end portion of the vehicle-side wall but is disposed in proximity to the front end portion of the vehicle-side wall.

2. The airbag device of claim 1,
    wherein the airbag package includes a radial-folded portion in which a portion of the initial folded form disposed between the inlet port and an outer peripheral edge of the initial folded form is compressed towards the inlet port along a radial direction of the initial folded form.

3. An airbag device for a driver's seat adapted to be mounted on a boss section of a steering wheel of a vehicle which boss section is disposed in a vicinity of a center of a rim of the steering wheel for gripping when driving, the airbag device comprising
    an airbag that is folded up in the form of an airbag package so as to be stowed in the boss section, and that is unfoldable and inflatable for protecting a driver,
    wherein an outer shell of the airbag includes:

a vehicle-side wall that includes an inlet port for introducing an inflation gas in a vicinity of the center thereof, and that is configured to be supported by an upper surface of the rim of the steering wheel when deployed; and a driver-side wall for restraining the driver, the driver-side wall extending from an outer circumferential edge of the vehicle-side wall and covering the inlet port;

wherein the airbag, before folded up into the airbag package, has an initial folded form in which the airbag is folded in a flat fashion such that the driver-side wall lies over the vehicle-side wall;

wherein the initial folded form of the airbag includes:

a folded-in portion in which a front edge portion of the vehicle-side wall for forming a front portion of the airbag as deployed is folded inwardly towards the inlet port beneath a front edge portion of the driver-side wall as laid flat; and a folded-back portion in which the front edge portion of the driver-side wall which adjoins the folded-in portion is folded towards a front end portion of the vehicle-side wall which extends from the inlet port and adjoins the folded-in portion;

wherein a thickness of the front portion of the airbag as inflated is greater than that of a rear portion of the airbag as inflated; and wherein:

the driver-side wall is composed of a driver-side base cloth;

the vehicle-side wall is composed of a vehicle-side base cloth, the vehicle-side base cloth including a rear-side component that is provided with the inlet port and a front-side component that includes a portion for forming the folded-in portion, a rear edge of the front-side component being joined to a front edge of the rear-side base cloth to form the vehicle-side base cloth; and an outer circumferential edge of the vehicle-side base cloth and an outer circumferential edge of the driver-side base cloth are joined together to form the outer shell of the airbag.

4. The airbag device of claim 3, configured to be mounted on a steering wheel in which a width in a front and rear direction of a front portion of the rim positioned farther forward than a center of the boss section is smaller than a width in a left and right direction of each of a left portion and a right portion of the rim positioned farther to the left or right than the center of the boss section.

5. The airbag device of claim 3, wherein the airbag package includes a radial-folded portion in which a portion of the initial folded form disposed between the inlet port and an outer peripheral edge of the initial folded form is compressed towards the inlet port along a radial direction of the initial folded form.

* * * * *